Sept. 4, 1956　　　　H. H. DETAMORE ET AL　　　　2,761,517
CONTROL MECHANISM FOR PROPELLERS
OF THE CONTRAROTATION TYPE
Filed May 15, 1952　　　　　　　　　　　　　　12 Sheets-Sheet 1

INVENTORS
HAROLD H. DETAMORE
RICHARD A. HIRSCH
RICHARD E. MOORE
ROBERT C. TRESEDER

THEIR ATTORNEYS

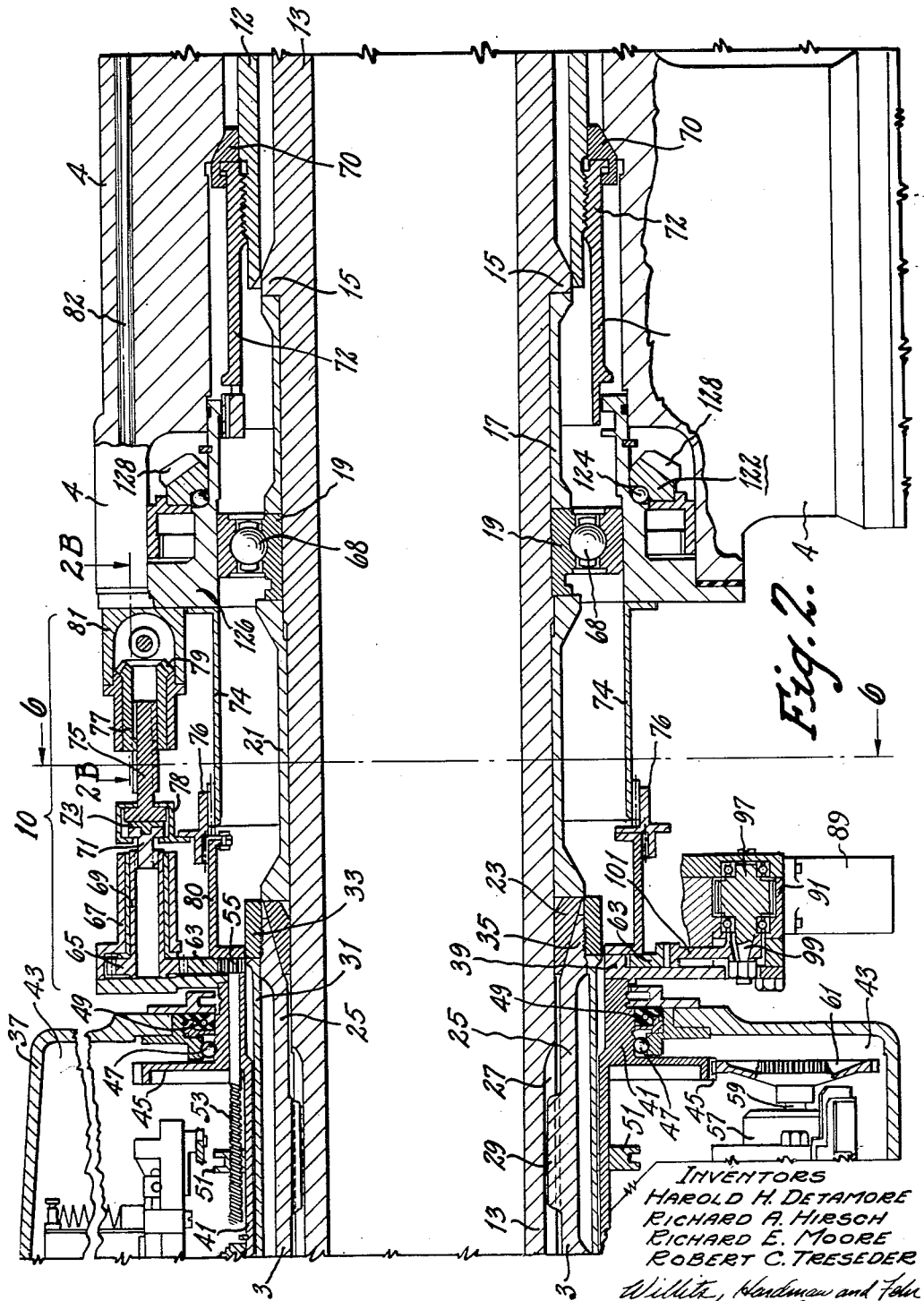

INVENTORS
HAROLD H. DETAMORE
RICHARD A. HIRSCH
RICHARD E. MOORE
ROBERT C. TRESEDER

THEIR ATTORNEYS

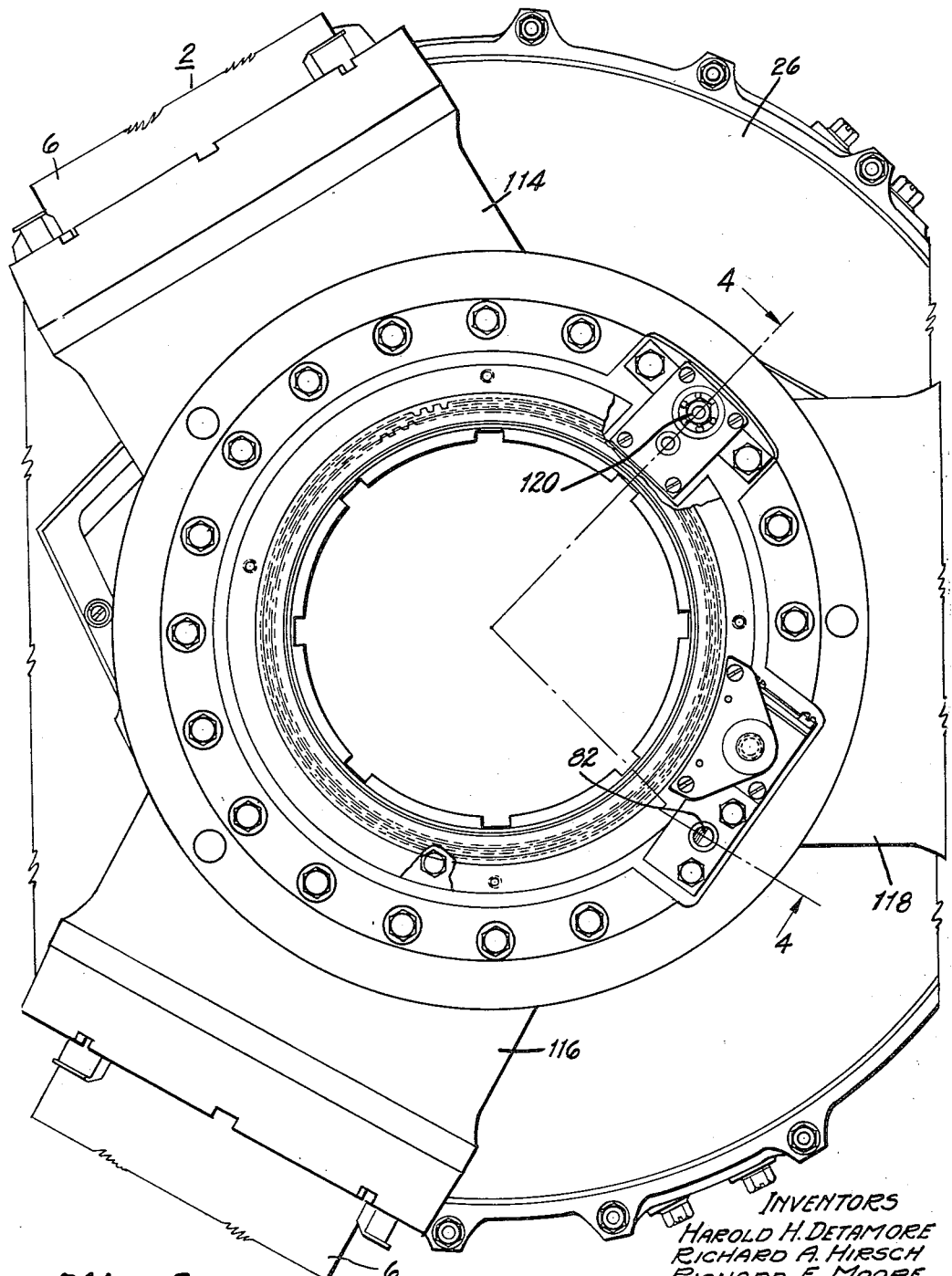

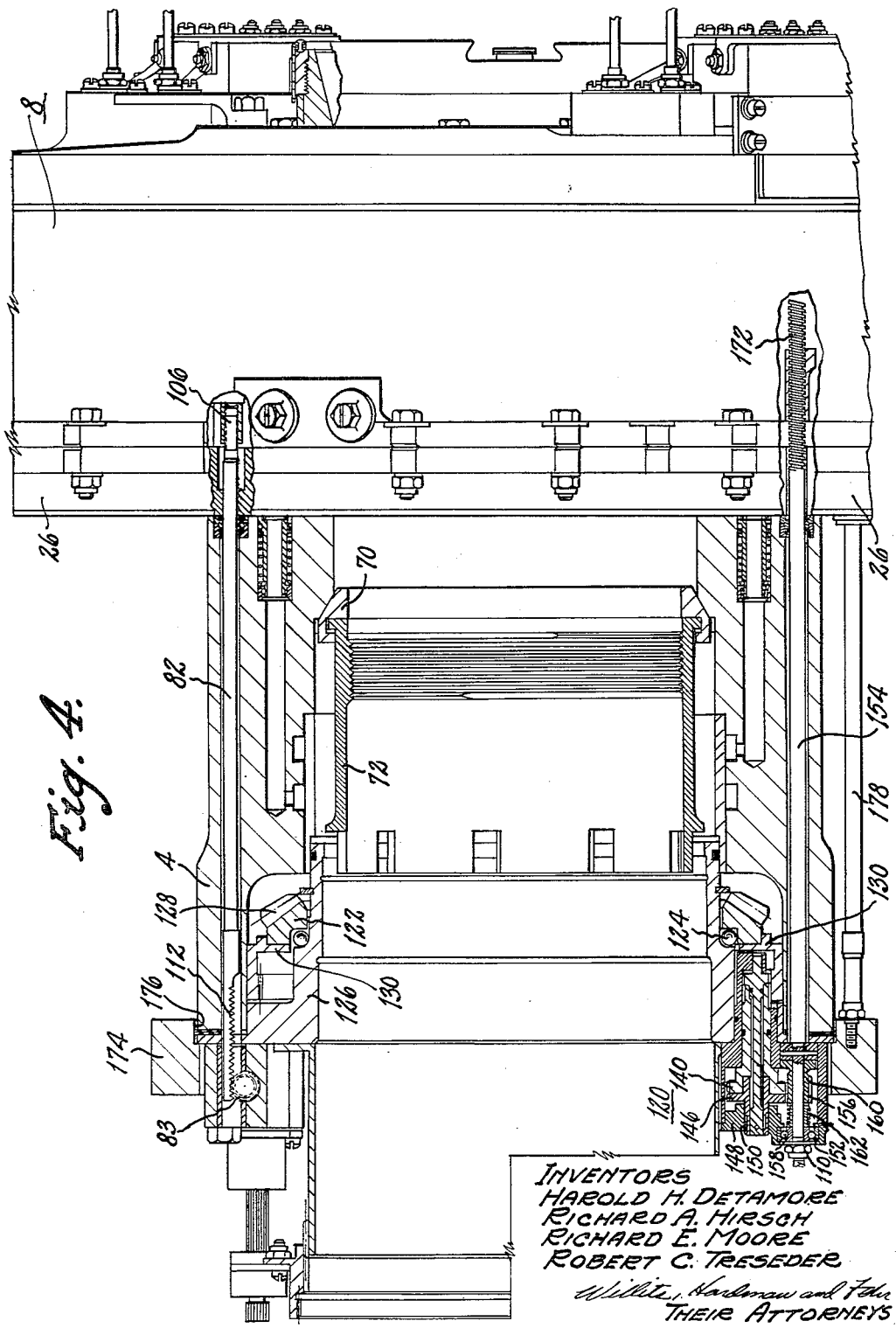

INVENTORS
HAROLD H. DETAMORE
RICHARD A. HIRSCH
RICHARD E. MOORE
ROBERT C. TRESEDER

THEIR ATTORNEYS

INVENTORS
HAROLD H. DETAMORE
RICHARD A. HIRSCH
RICHARD E. MOORE
ROBERT C. TRESEDER

THEIR ATTORNEYS

INVENTORS
HAROLD H. DETAMORE
RICHARD A. HIRSCH
RICHARD E. MOORE
ROBERT C. TRESEDER

THEIR ATTORNEYS

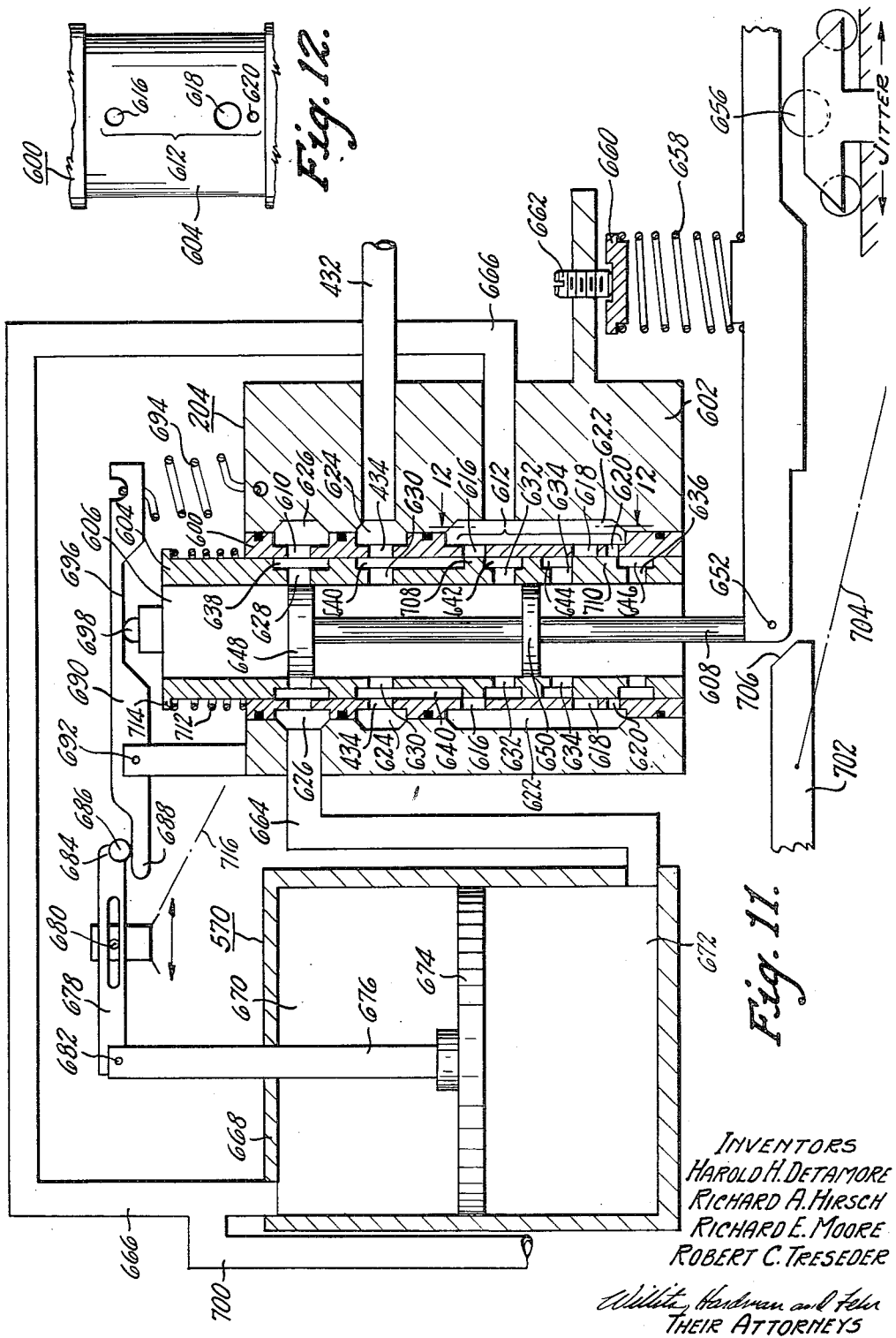

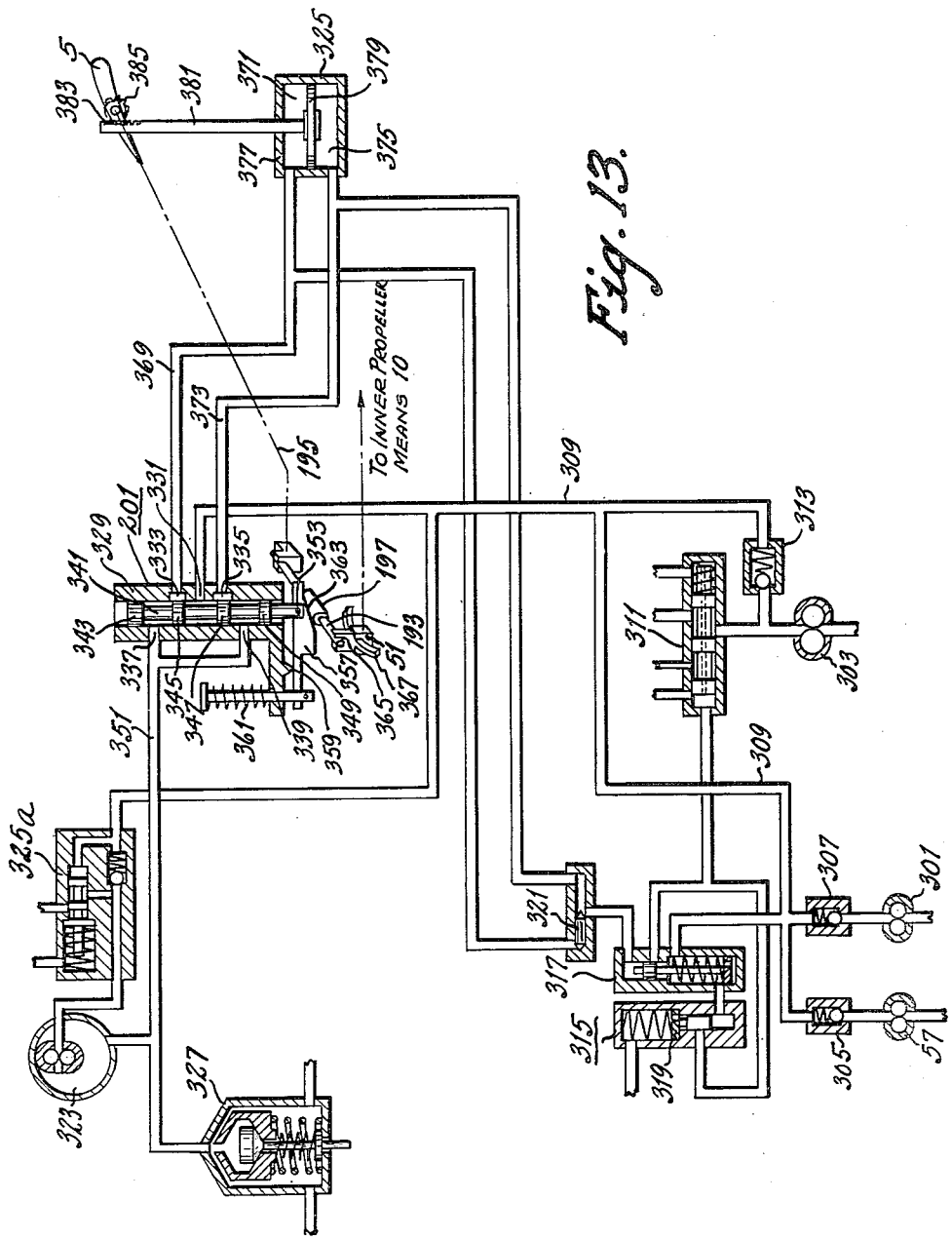

United States Patent Office 2,761,517
Patented Sept. 4, 1956

2,761,517

CONTROL MECHANISM FOR PROPELLERS OF THE CONTRAROTATION TYPE

Harold H. Detamore, Dayton, Richard A. Hirsch, West Milton, and Richard E. Moore and Robert C. Treseder, Dayton, Ohio, assignors to General Motors Corporation, Detroit, Mich., a corporation of Delaware Application May 15, 1952, Serial No. 287,868

28 Claims. (Cl. 170—135.27)

The present invention relates to propellers and particularly to variable pitch propellers of the dual or contrarotation type.

One of our objects is to provide means for substantially coincident adjustment of the pitch of the inboard and outboard propeller elements under the control of means selectively operable to maintain substantially constant speed of both propeller elements in a governing regime, to select any pitch position in the blade angle regime, to select the negative thrust regime, or to select the feathered regime of operation. The aforementioned and other objects are accomplished by providing an actuator within the regulator rotatable with the inboard element, means within the inboard regulator for controlling the movements of the actuator and means operatively connected with and movable by the actuator for controlling the coincident application of power to the blade adjusting means in both propeller elements.

Specifically, both the inboard and outboard propeller elements have secured thereto and rotatable therewith regulator structures. Each regulator has mounted therein fluid pressure developing pumps, and a plurality of control valve and tube assemblies for directing the flow of fluid to and from blade adjusting servo-motors or torque units mounted on hubs, in which the propeller blades are mounted for pitch adjustment. In addition the inboard regulator houses a fluid pressure actuator, governing means for controlling the operation of the actuator and blade angle control means for controlling the operation of the actuator in lieu of the governing means. The actuator in turn controls the movements of a master shaft provided with means for coincidentally positioning the distributor valves in both the inboard and outboard regulators to effect coincident pitch adjustment of the blades by the torque units in both the inboard and outboard propeller elements. Additionally each propeller element has associated therewith a feed back mechanism which follows up the blade movement and repositions the distributor valves to stop the flow of fluid to and from the torque units when the blade angle dictated by the actuator has been obtained by the blades.

The governing means provides a rate of blade angle correction in the governed speed regime of operation that is proportional to the amount of speed error and to the rate of change of speed error. The governing means comprises a valve assembly having two relatively movable elements and a servo-motor having a piston and cylinder. One of the governor valve elements is sensitive to centrifugal force and hence the speed of rotation of the inboard propeller element. The position of the servo-motor piston is controlled by the fluid flow applied by the centrifugally actuated valve element. The piston in turn, controls the position of the other governing valve element. Fluid flow to the actuator from the governor valve assembly is proportional to the amount of speed error, while fluid flow to the actuator from the servo-motor cylinder, caused by movements of the piston, is proportional to the rate of change of speed error. The fluid flows from the governing means are combined and flow to the actuator thru a single duct or tube. The actuator in turn operates the master shaft to effect blade angle adjustment at a rate proportional to speed error and rate of change of speed error.

A pilot's manual control lever is provided for selecting any one of the regimes of propeller operation. In addition a low pitch stop is provided for limtiing the minimum low angle obtainable by the blades in the governed speed regime.

Further objects and advantages of the present invention will be apparent from the following description, reference being had to the accompanying drawings wherein a preferred embodiment of the present invention is clearly shown, and wherein similar reference characters denote similar parts throughout the several views.

In the drawings:

Figs. 2 and 2A are enlarged longitudinal sectional views of the structure illustrated in Fig. 1, the sections being taken on a plane parallel with the paper.

Fig. 2B is a longitudinal sectional view taken along lines 2B—2B of Fig. 2.

Fig. 3 is an enlarged transverse sectional view taken along lines 3—3 of Fig. 1.

Fig. 4 is a longitudinal view taken in the direction of arrows 4—4 of Fig. 3, partly in section and partly in elevation.

Fig. 1 is an enlarged sectional view of the governing means shown in Fig. 10.

Fig. 12 is a fragmentary elevational view of a portion of the governor valve assembly in general in the direction of the arrows 12—12 of Fig. 11.

Fig. 13 is a schematic drawing of the fluid pressure system in the outboard regulator.

Figure 1:
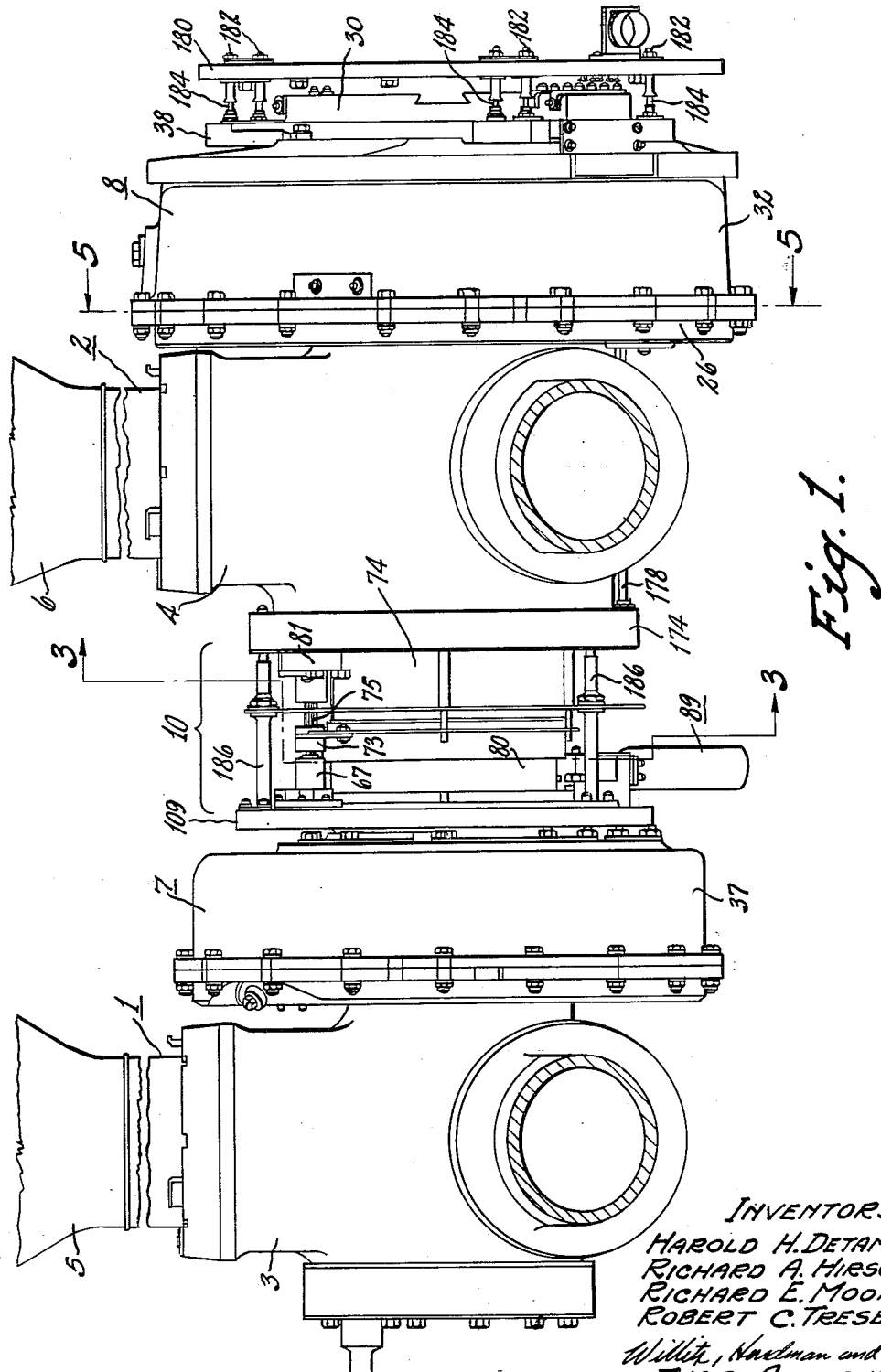
Fig. 1 is an elevational view of the inboard and outboard propeller elements.

Referring more particularly to Fig. 1 of the drawings, the numeral 1 generally designates an outboard propeller element and 2 generally designates an inboard propeller element. The outboard propeller element 1 comprises a hub 3 within which are mounted a plurality of blades 5. The blades 5 are mounted for movement relative to the hub 3 in a manner disclosed in the Blanchard et al. Patents 2,307,101 and 2,307,102. The hub 3 has secured thereto and rotatable therewith a regulator assembly 7 within which fluid pressure developing and distributing means are mounted in a manner later to be described. The inboard and outboard propeller elements are axially spaced and between them interpropeller means designated generally by 10 are provided for assuring coincident adjustment in the pitch position of the blades of both propeller elements. The inboard propeller element 2 likewise comprises a hub 4 supporting a plurality of blades 6 which are mounted for movement relative to the hub. The hub 4 likewise has secured thereto and rotatable therewith a regulator 8 within which fluid pressure developing and distributing means are mounted for controlling the movements of the inboard propeller element blades.

Figures 2A, 2B:
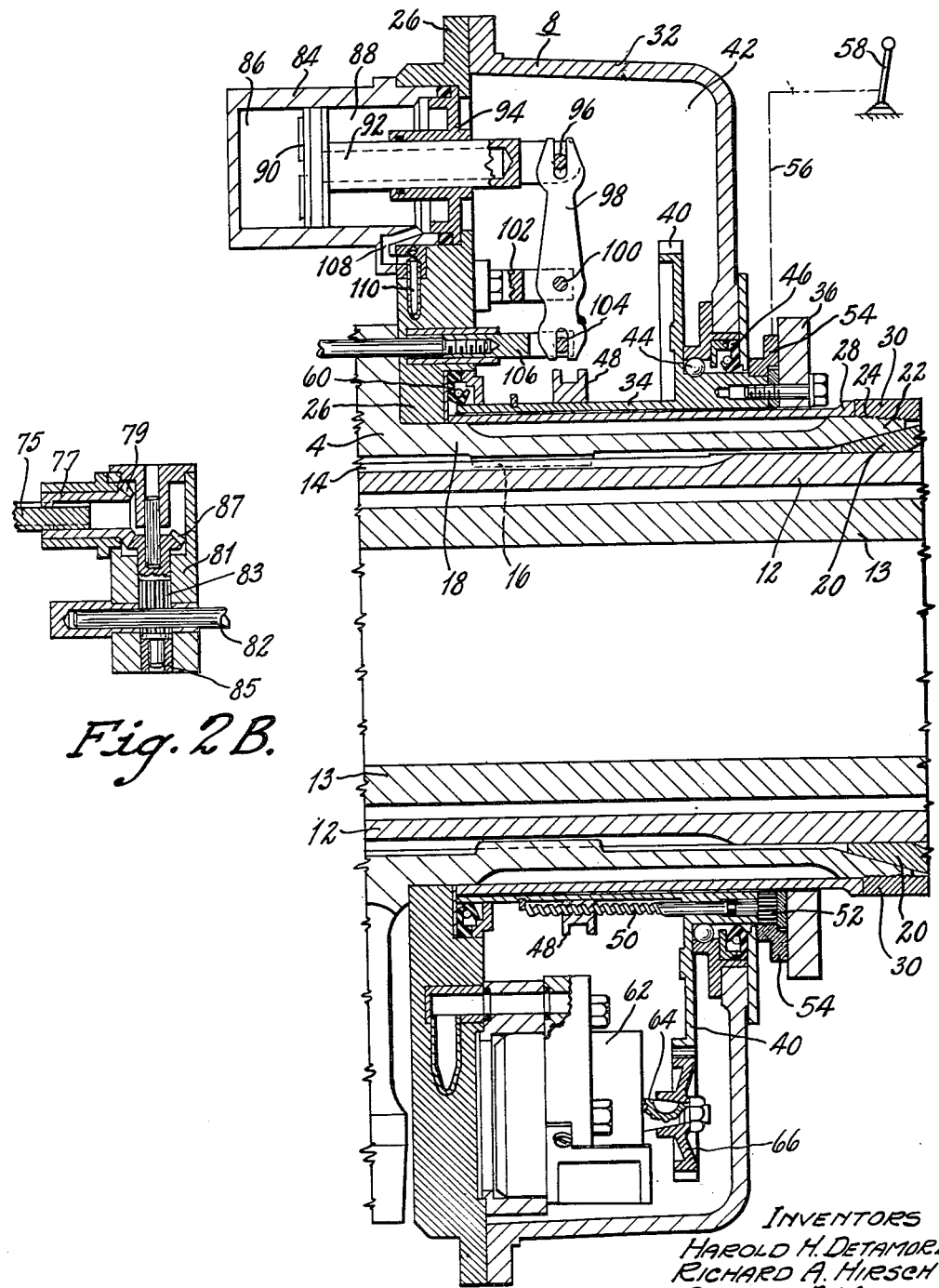

Referring more particularly to Figs. 1 and 2A the inboard and outboard propeller elements are secured to oppositely rotating hollow concentric shafts 12 and 13 respectively. The shafts 12 and 13 are driven through gear reduction means, not shown, by a turbine not shown. The shaft 12 is provided with a plurality of spline teeth 14 on only a portion of its outer peripheral surface, which teeth mate with teeth 16 disposed on the inner peripheral surface of a hub sleeve 18 extending axially of the hub. Adjacent the outer end 22 of the hub sleeve a rear cone assembly 20 is forced axially to the left, as viewed in 2A of the drawings, and the hub 4 (Fig. 2) is clamped to shaft 12 by means of shaft nut 72 and cones 70 and 20. The outer peripheral surface of the end 22 of the hub sleeve is provided with threads 24. Seated with a recess in the sleeve portion 18 of the hub and extending radially outward thereof is an annular member 26 which serves as the front plate of the inboard regulator 8. Ring 28 is tanged to annular member 26. The ring 28 rotates with the hub sleeve 18 and the hub 4, and is urged to the left as viewed in Fig. 2A by means of a sleeve nut 30 which engages the threads 24 on the end 22 of the hub sleeve. A regulator cover 32 is flanged connected to and rotatable with annular member 26. Spaced outward and concentric with the ring 28, is an adapter sleeve 34 which is rigidly connected to a member 36 that is in turn connected to an adapter backing plate 38, shown in Fig. 1. The adapter backing plate 38 is connected to the engine nose or other nonrotatable part of the aircraft. In this manner the adapter sleeve 34, provided with an integral external toothed ring gear 40, is maintained stationary with respect to the regulator cover 32 and front plate 26. The front plate 26 of the cover 32 and the adapter sleeve 34 cooperate to provide a torus shaped reservoir 42 within which hydraulic fluid is contained. Bearing means 44 and sealing means 46 are provided between the rotating cover 32 and the stationary adapter sleeve 34.

Mounted on the stationary adapter sleeve 34 and movable axially thereof is a control ring 48. The control ring is provided with a plurality of threaded openings which engage a plurality of high lead screws 50, rotated by means of pinion gears 52 journalled within the stationary adapter sleeve 34. The gears 52 have toothed engagement with an internal ring gear or circular rack 54 likewise journalled on the adapter sleeve 34. The circular rack 54 is connected by mechanical linkage 56 to a pilot's control lever 58 mounted in the cockpit of the aircraft.

Sealing means 60 are also provided between the annular member 26 and the inner end of the stationary adapter sleeve 34. Mounted within the reservoir 32 are a plurality of pressure developing pumps, one of which is indicated by 62. The pumps are of the gear type, and the drive gear is driven by shaft 64 having a pinion gear 66 attached thereby, the shaft 64 being journalled within the pump housing, which is attached to the front plate 26 of the regulator 8 and is rotatable therewith. The externally toothed ring gear 40, which is integral with the adapter sleeve 34, has toothed engagement with the pinion 66. Thus upon relative rotation between the regulator 8 and the stationary adapter sleeve 34 the shaft 64 will be rotated by reason of the engagement between gear 66 and gear 40, and rotation of the shaft 64 will, in turn, cause the drive gear of the pump 62 to develop hydraulic fluid pressure.

Referring more particularly to Fig. 2 of the drawings the hub 4 of the inboard propeller element is supported by bearing means 68 upon the oppositely rotating hollow shaft 13. A front cone assembly 70, urged by means of a sleeve nut 72 which engages external threads adjacent the inner end of shaft 12, cooperates with the rear cone assembly 20 to position the hub 4 upon the shaft. The shaft 13 is provided with a shoulder 15. A spacer sleeve 17 abuts the inner race 19 of bearing means 68 at the other end. A second spacer sleeve 21 likewise abuts the inner race 19 of the bearing means 68 at one end and at the other end abuts a rear cone assembly 23 of the outboard propeller element 1. The rear cone assembly 23 of the outboard propeller element engages a hub sleeve 25 which is integral with the hub 3 and cooperates with a front cone assembly, not shown, to determine the axial position of the outboard element on the shaft 13. The shaft 13 is likewise provided with a plurality of straight spline teeth 27 on a portion of its external surface which mate with spline teeth 29 on the internal surface of hub sleeve 25. A ring 31 holds a front plate, not shown, of the outboard regulator upon the hub sleeve 25 in such a manner that the front plate rotates with the propeller hub 3. A sleeve nut 33, which engages threads on the end 35 of the hub sleeve 25 draws the ring 31 to the left as viewed in Fig. 2 of the drawings to hold the front plate of the regulator in place. An outboard regulator cover 37 is rigidly connected to the front plate of the outboard regulator and rotates therewith. A sleeve member 74 is rigidly connected to the inboard propeller hub 4 at one end and is splinedly connected to a ring member 76 at the other end. Ring member 76 is pinned or otherwise rigidly connected to a sleeve member 80. Sleeve member 80 is connected by pins or other suitable means, not shown, to an adapter plate 39 of the outboard adapter assembly associated with the outboard regulator 7. The adapter plate is in turn rigidly connected to an adapter sleeve 41 which extends axially into and forms one wall of a reservoir 43 in the outboard regulator 7. In this manner, adapted sleeve 41 is rotatable with the inboard propeller hub, and is likewise provided with an integral externally toothed ring gear 45 which extends into the regulator reservoir 43. Suitable bearing means 47 and sealing means 49 are provided between the regulator cover 37 and the adapter sleeve 41. Mounted for axial movement upon the adapter sleeve 41 is a control ring 51 having a plurality of threaded openings through which a plurality of high lead screws 53 extend. The high lead screws 53 are provided at one end with pinion gears 55 journalled in the adapter sleeve 41. A plurality of gear type pressure developing pumps, one of which is designated by 57, are mounted on the front plate of the regulator 7. The pump 57 is driven by a shaft 59 having attached thereto at one end, a pinion gear 61 which meshes with the externally toothed gear 45 of the adapter sleeve 41. Thus, during rotation in opposite directions of shafts 12 and 13, the relative rotation between gears 45 and 61 will effect operation of the pump 57 in a manner described with reference to the inboard regulator 8.

Axial movement of the control ring 51, caused by rotation of the high lead screw 53, is effected by rotation of an internally and externally toothed ring gear 63. The internal teeth of ring gear 63 mesh with the pinion 55 and the external teeth mesh with a pinion gear 65. Pinion gear 65 is housed within a casing 67 which is rigidly connected to the adapter sleeve 41 and hence rotates with the inboard hub 4. The pinion 65 is provided with an integral axially extending sleeve 69 which splinedly engages a shaft 71 of a coupling assembly generally designated by 73. The coupling assembly 73 is enclosed by the housing 78, driven by the ring member 76. The coupling 73 is in turn connected by means of a shaft 75, which is splinedly connected to a sleeve member 77 that is integral with a beveled gear 79. This assembly forms the interpropeller means depicted generally by the numeral 10 in Fig. 1.

Referring more particularly to Fig. 2B the mechanism for transmitting rotating movement to the bevel gear 79 is shown in greater detail. The bevel gear 79 is journalled within a member attached to housing 81. Within housing 81 a pinion gear 83 journalled in bearing 85 at one end and having an integral bevel gear 87 at the other end, is adapted to be rotated by means of a rack integral with a shaft 82. The gears 79, 83 and 87 form a gear train. The shaft 82 is disposed within the hub 4 of the inboard regulator and is adapted for axial movement relative thereto under the control of an actuator later to be described.

For the present it will suffice to say that upon axial movements of the shaft 82 the pinion 83 and the bevel gear 87 will be rotated, which rotation will be transmitted to bevel gear 79. Rotation of bevel gear 79 will in turn be transmitted by means of sleeve 77 to shaft 75 and to the coupling assembly 73. The coupling assembly 73 will in turn effect rotation of shaft 71 which is splinedly connected to sleeve 69 integral with the pinion 65 which, in turn, thru ring gear 63 will cause rotation of pinion 55. Rotation of pinion 55 and associated high lead screw 53 will effect axial movement of the control ring 51 disposed within reservoir 43 of the outboard regulator 7. Movements of the control ring 51 within the outboard regulator 7 will effect actuation of the fluid pressure distributing means disposed within the outboard regulator 7 to effect an adjustment in the pitch position of the outboard propeller blades in a manner later to be described.

Figure 8:
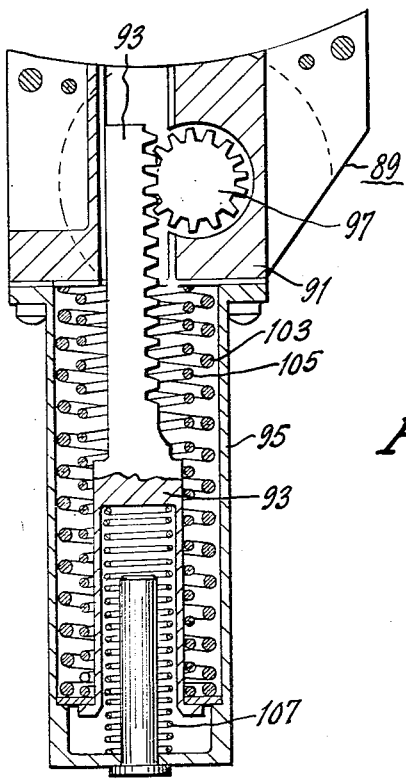
Fig. 8 is an enlarged longitudinal sectional view of the anti-back lash mechanism shown in Fig. 6, the section being taken on a plane parallel with the paper.

Disposed diametrically opposite the interpropeller means 10 and associated with the ring gear 63 thereof, is an anti-back lash mechanism designated generally by 89. The function of the anti-back lash mechanism is to preload the external teeth of ring gear 63 and the coupling system to such an extent that movement of ring gear 63 will coincide exactly with the movements of (Fig. 2A) dictated by the actuator piston 90. Thus, the anti-back lash mechanism 89 functions to assure that the movements of control ring 51 of outboard regulator 7 will be representative of the dictates of the inter-propeller means 10. Referring more particularly to Figs. 2 and 8, the anti-back lash mechanism 89 will be described in greater detail. The anti-back lash mechanism is contained in a housing 91 which is rigidly attached to the adapter plate 39 of the outboard regulator 7 and comprises a rack member 93 movably mounted within a cup-shaped member 95. The teeth of the rack member engage a pinion 97 which is journalled in the housing 91. Pinion 97 is provided with an axially extending stub shaft 99 upon which is rigidly mounted an externally toothed gear member 101. Gear member 101 has toothed engagement with the external teeth of ring gear 63. Within the cup-shaped member 95 a plurality of coaxially disposed springs 103 and 105 tend to assist centrifugal force in urging rack member 93 outwardly, which appears as downward movement in Fig. 8. Another spring 107 mounted between an end wall of the cup-shaped member 95 and the end of a slot in the rack member 93, opposes the action of centrifugal force and the springs 103 and 105 tending to urge the rack member 93 downwardly as viewed in Fig. 8. Thus during rotation of propeller elements 1 and 2 the anti-back lash mechanism 89 will preload the external teeth of ring gear 63 so as to assure precise transmission of movement between pinion gear 65 and ring gear 63 effected by the actuator piston 90.

Referring to Figs. 2A, 3 and 4, the means for actuating the master shaft 82 which operates the interpropeller means 10 will now be described in detail. Mounted on the front plate 26 of the inboard regulator 8 is an actuator cylinder 84. Disposed within the actuator cylinder and dividing the cylinder into an increase pitch chamber 86 and a decrease pitch chamber 88, is a piston 90 having a rod 92 which extends thru an aperture in an end wall 94 of the cylinder 84. The free end of the piston rod 92 is pivotally attached at 96 to a lever 98 pivoted intermediate its end at 100 to a bracket 102 which is rigidly attached to the front plate 26 of the inboard regulator. The other end of the lever is pivotally attached at 104 to a stub shaft 106 which is in turn rigidly connected to the master shaft 82. Within the walls of the cylinder 84 and connected to pockets or chambers in the front plate 26 of the inboard regulator, are passages which lead to the increase and decrease pitch chambers, respectively, of the actuator cylinder to supply fluid under pressure to and allow drain from the actuator chambers. One of these passages is shown at 108 leading to the decrease pitch chamber 88 at one end and connected to a chamber 110 in the front plate of the regulator at the other end. Fluid under pressure is supplied to increase pitch chamber 86 of the actuator under the control of either governing means or blade angle control means mounted within the inboard regulator which are to be described in detail later. For the present it is sufficient to be appraised of the fact that upon movements of the actuator piston 90 axial movements of the master shaft 82 will ensue due to the interconnection of these two elements by the lever 98. Axial movements of the master shaft 82 will likewise cause movements of a rack 112 associated with one end thereof as shown in Fig. 4. Movements of the rack 112 will be transmitted to the pinion 83 which will, in turn, effect movement of the control ring 51 within the outboard regulator 7 thru the medium of the inter-propeller means 10, previously described. Movements of the master shaft 82 under the control of the actuator piston 90 are utilized to position distributor valves disposed within both the inboard and outboard regulators. A detailed description of the fluid pressure circuit disposed within each regulator will be dealt with later. For the present it will be sufficient to say that by the positioning of the distributor valves within the regulators, fluid under pressure will be applied to the blade actuating servo-motors or torque units mounted on the propeller hubs, by means of passages within the regulator front plates and hubs, as is shown and described in the Blanchard et al. patents, previously referred to. Likewise, the torque units associated with the propeller blades are similar to those disclosed in the Blanchard, et al. patents. The inboard and outboard regulator distributor valves and their associated linkages are all basically of the same design. In this manner the response curve for the inboard and outboard propeller blade angles will be substantially the same. However, provision is made for a continuously variable differential movement between the inboard and outboard propeller blades to compensate for the slip-stream effect, so that each propeller element may operate efficiently at all pitch positions thereof, and assume its proportionate share of the load. Means for accomplishing this result will be described in detail later.

Figure 7:
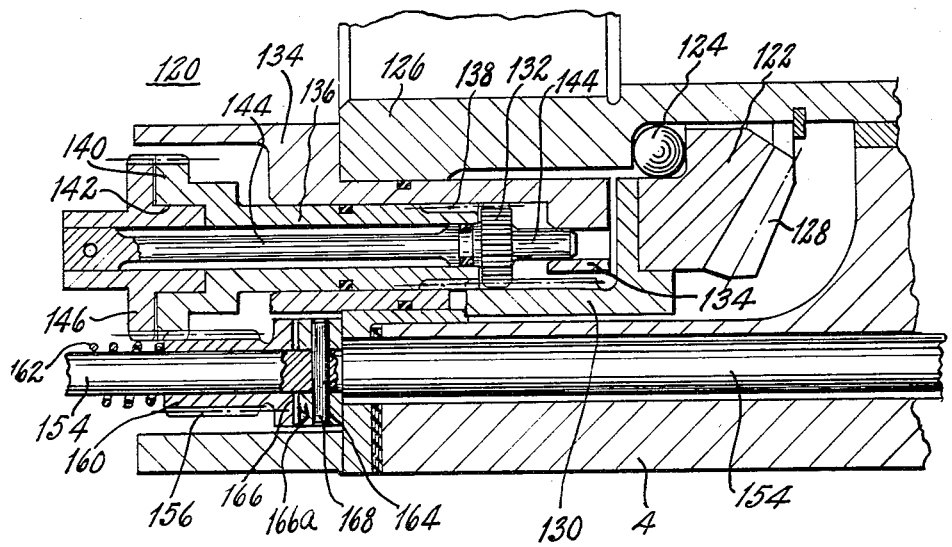
Fig. 7 is an enlarged sectional view of parts of the rotary feed back mechanism for the inboard propeller element, shown in section in Fig. 4, before final assembly thereof.

Referring particularly to Fig. 3 of the drawings, the inboard propeller hub 4 is shown as having three blade sockets 114, 116, 118 disposed substantially 120° apart. Rotary feed back mechanism designated generally by 120 is associated with the propeller blades of the inboard propeller element 2. Referring more particularly to Figs. 4 and 7, a master gear 122 supported by bearing means 124 upon sleeve member 126 which is attached to the propeller hub 4, coordinates the movements of all the blades 6 associated with the inboard propeller element. This is accomplished by engagement of the bevel teeth 128 of the master gear with bevel gears associated with each of the rotatable blades 6, not shown. In this manner the position of the master gear 122 represents the pitch position or angular disposition of the propeller blades 6 of the inboard propeller element. Master gear 122 is, in turn, rigidly connected to a ring member 130 which is mounted for rotation relative to the hub 4, and is provided with spline teeth on an internal surface thereof which engage a splined annular member 132 disposed in a hole in ring member 126. Annular member 132 is integral with a shaft 144 journalled at one end in a sleeve member 134 which is mounted in the hole in ring 126. Disposed within the bore of member 134, is a sleeve member 136 likewise having splined engagement with ring member 130 at one of its ends 138. The other end of the sleeve 136 is integral with a pinion gear 140 formed with an annular recess 142. Disposed within the annular recess 142 and pinned to the end of shaft 144 is a second pinion gear 146. The pinion gears 140 and 146 are the same diameter and have an equal number of teeth. Shaft 144 is a torsion shaft and is initially twisted a predetermined amount. Referring more particularly to Fig. 4 of the drawings, a cover assembly 148 having a pair of holes 150 and 152 forms an end wall of the feed back mechanism 120. Within the opening 150 an integral sleeve extension of gear 146 is journalled, and extending thru the opening 152 of the cover 148 is a rotary feed back shaft 154. The rotary feed back shaft 154 is supported by bearing means 158 within the member 148. Surrounding a portion of the rotary feed back shaft 154 is a sleeve member 160 having a toothed portion 156 which meshes with the pinion gears 140 and 146. A coil spring 162, supported between the bearing means 158 and the toothed portion 156, urges the sleeve 160 to the right as viewed in Fig. 4 of the drawings. One end of sleeve member 160 is provided with radially extending serrations 166 which mate with similar serrations on a plate 166a. The plate 166a is provided with a slot 164 through which a pin 168 extends and fastens the plate to shaft 154. The pin 168 and the serrations transmit movement between the sleeve member 160 and the rotary feed back shaft 154. The end of the rotary feed back shaft 154 which extends through the opening 152 of the member 148 is threaded, and a nut 170 engages these threads. The axial position of the feedback shaft 154 is established by bearing 158. Adjustment is accomplished by loosening nut 170 and rotating shaft 154.

The torsion shaft 144 is twisted a predetermined amount prior to final assembly while the several parts are in the position as shown in Fig. 7 by rotating the gear 146 so that the backlash between pinion gear 132 and ring gear 130 is taken up. Thereafter the assembly of gears 140 and 146 are moved axially from the postion of Fig. 7 to the position of Fig. 4 so that both gears 140 and 146 engage the gear 156 to thereby maintain alignment between the teeth of gears 140 and 146. Thus, the torsion shaft constitutes an anti-backlash device for the rotary feedback mechanism for the inboard propeller element and assures precise movement of the sleeve 160 under the control of the master gear 122. The spring and pin connection between the sleeve 160 and the rotary feed back shaft 154, takes up any relative deflection which may occur between the various elements of the feed back mechanism. The rotary feed back shaft 154 extends axially of the propeller hub 4 thru the regulator front plate 26 and into the reservoir 32 of the inboard regulator. The function of the rotary feed back mechanism is to position means operated by the high lead screw 172, formed on one of the rotary feed back shafts 154, which repositions or follows-up the distributor valve within the inboard regulator to stop the flow of fluid to and from the inboard propeller element torque units when the blade angle change called for by the actuator and master shaft assembly have been obtained by the blades of the inboard propeller element. The specific means for accomplishing the result will be later described. The outboard propeller element also has associated therewith a feed back mechanism of a somewhat different type which will also be later described. It is sufficient to say at this time that the feed back mechanism associated with the outboard propeller element likewise functions to reposition the distributor valve within the outboard regulator when the blade angle change called for by the inter-propeller means 10 under the control of the actuator and master shaft assembly has been obtained by the blades of the outboard propeller element.

Referring to Figs. 1 and 4 of the drawings, a ring member 174 is provided with an internal shoulder 176 which engages an end surface of the inboard propeller hub 4. A plurality of hollow axial deflecting connectors, one of which is shown at 178, having connection at one end with the front plate 26 of the regulator 8, are utilized. The hollow connectors 178 provide electrical conduits thru which electrical energy may be transmitted from the aircraft to the outboard regulator for purposes of operating an electric feathering pump motor. As shown in Fig. 1 a stationary adapter accessory plate 180 is provided with a plurality of terminals 182 which are connected by means of connectors 184 to a plurality of slip rings not shown which are mounted on the inboard regulator cover 32. A plurality of brushes not shown, which cooperate with the slip rings are mounted on the adapter backing plate 38 and provide transmission means for electrical energy to an electric feathering pump motor mounted within the inboard regulator 8. In a similar manner the electrical energy is transmitted thru hollow connectors 178 to the terminals in the ring member 174, Fig. 4, from which it is conducted by connectors 186 to a slip ring plate 109 associated with the outbroad regulator 7. The slip ring plate 109 likewise is provided with a plurality of slip rings, not shown, which engage brushes attached to the outboard regulator cover 37, Fig. 2, to conduct electrical energy to an electric feathering pump motor disposed within the outboard regulator 7.

Figure 5:
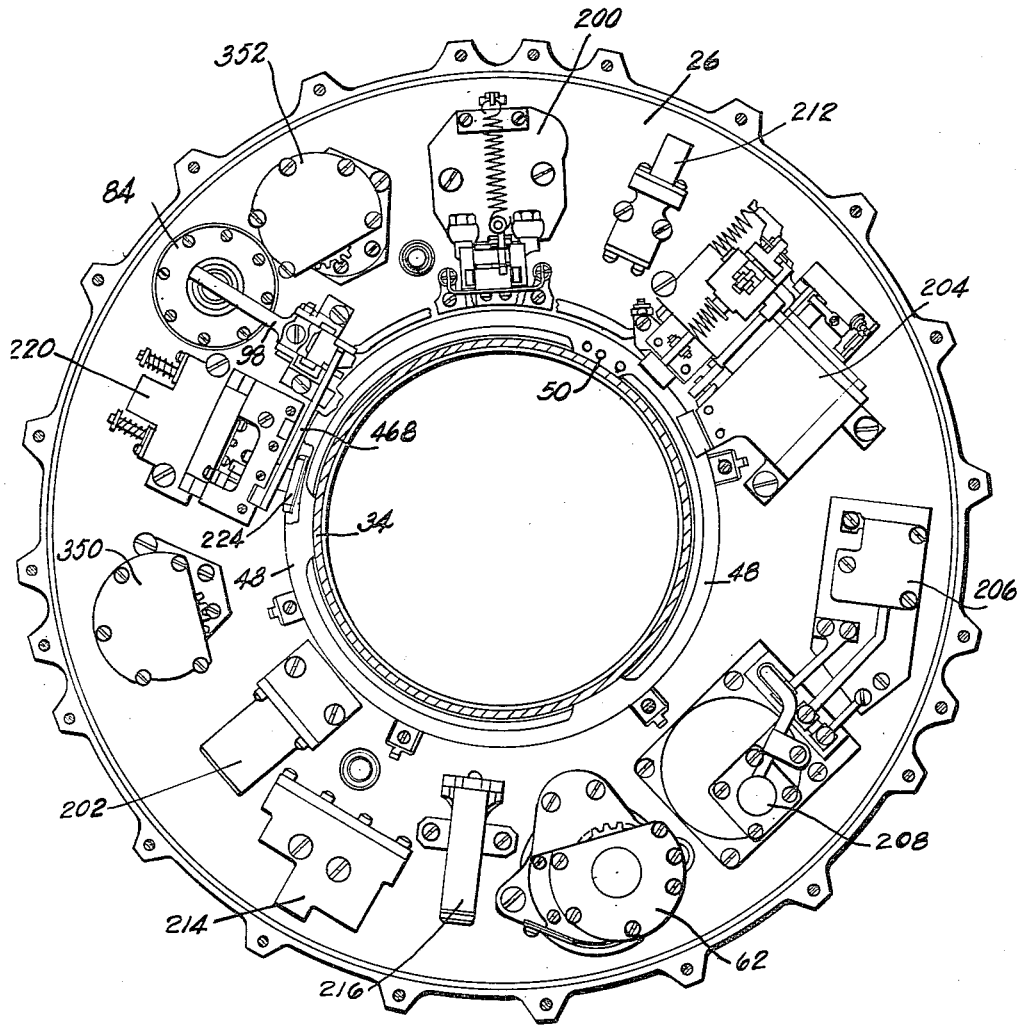
Fig. 5 is an enlarged elevational view of the inboard regulator with the cover removed somewhat as indicated by the line and arrows 5—5 of Fig. 1.

Referring to Fig. 5 of the drawings, the various elements of the fluid pressure circuit mounted within the inboard regulator 7 are shown in their relative position mounted on the front plate 26. The various functions and operation of the elements will be described in connection with the schematic circuit diagrams shown in Figs. 10, 11, and 12 and the purpose of Fig. 5 is to merely show the relative disposition of the various parts in the structural embodiments of the present invention. Starting at the top of the drawing and proceeding clockwise thereabout, a distributor valve assembly 200 is mounted on the front plate 26. Also mounted on the front plate 26 are a feathering pump control valve 212; a governor valve assembly 204; a centrifugal switch 206; a feathering pump and motor assembly 208; a system pump 62; a flow control valve 216; a pressure control valve assembly 214; a pressure reducer valve 202; a second system pump 350; a blade angle control valve assembly 220; the actuator cylinder 84; and the third system pump 352. Control ring 48 disposed within the inboard regulator is shown as having operative connection with the blade angle control valve assembly 220 by means of shoe 224. The purpose of this interconnection and the function of the blade angle control valve assembly will be described in detail later.

Figure 6:
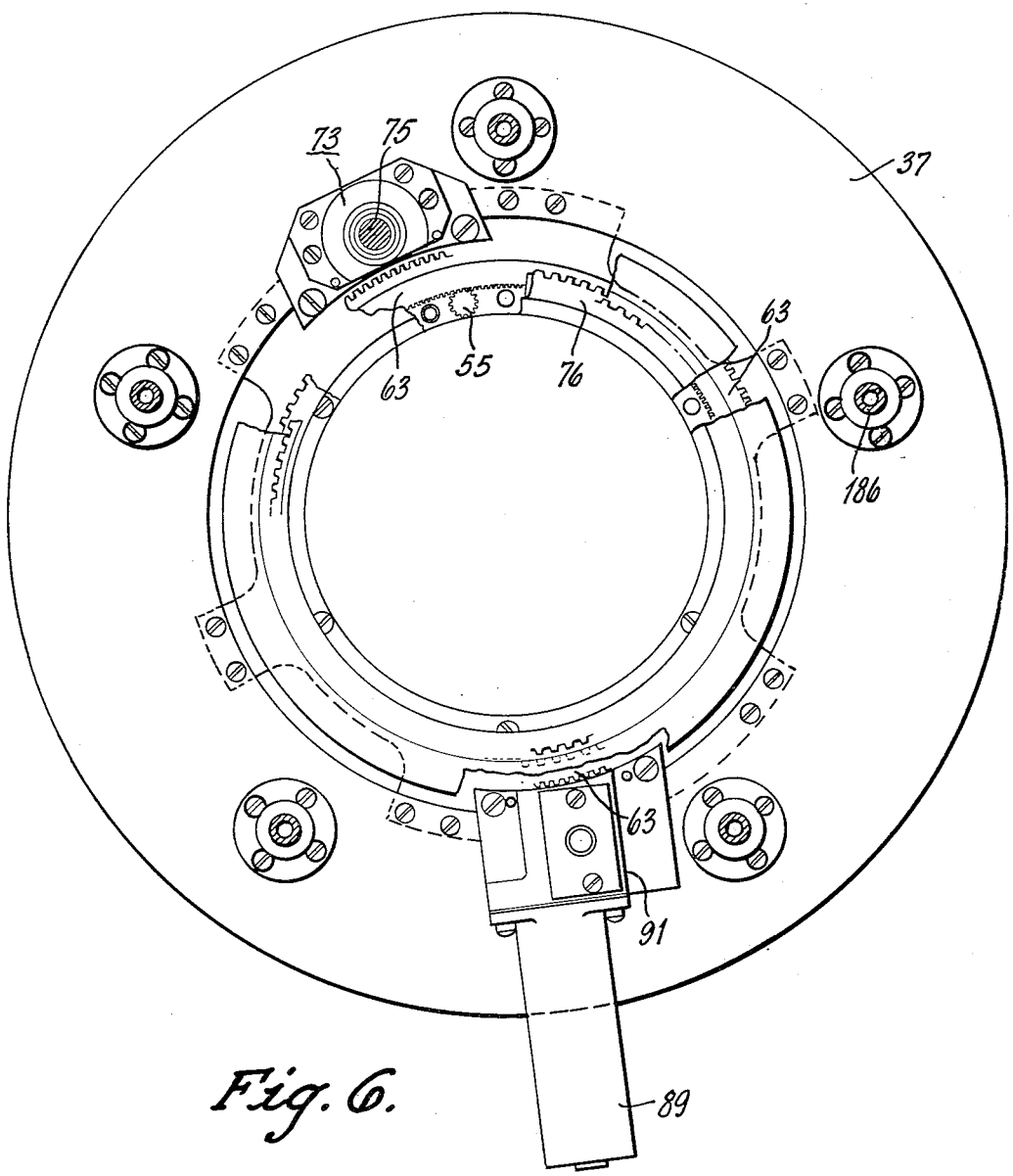
Fig. 6 is a transverse sectional view taken along lines 6—6 in the direction of the arrows of Fig. 2.

Referring to Fig. 6 of the drawings, the various elements of the inter-propeller means 10 are shown in composite form. In Fig. 6 the coupling 73 with the shaft 75 are shown in their relative position with respect to the cover 37 of the outboard regulator. The internal and external ring gear 63 is shown in Fig. 6 in engagement with one of the pinion gears 55. The splined ring member 76 is also shown in its location relative to the inter-propeller means. In addition, the anti-back lash mechanism 89 associated with the inter-propeller means 10 is shown in outline form. For the sake of brevity the various elements of the outboard regulator are not shown in detail in a structural embodiment, as the various elements therefore mounted in the same manner as has been described in detail in connection with the inboard regulator.

Figure 9:
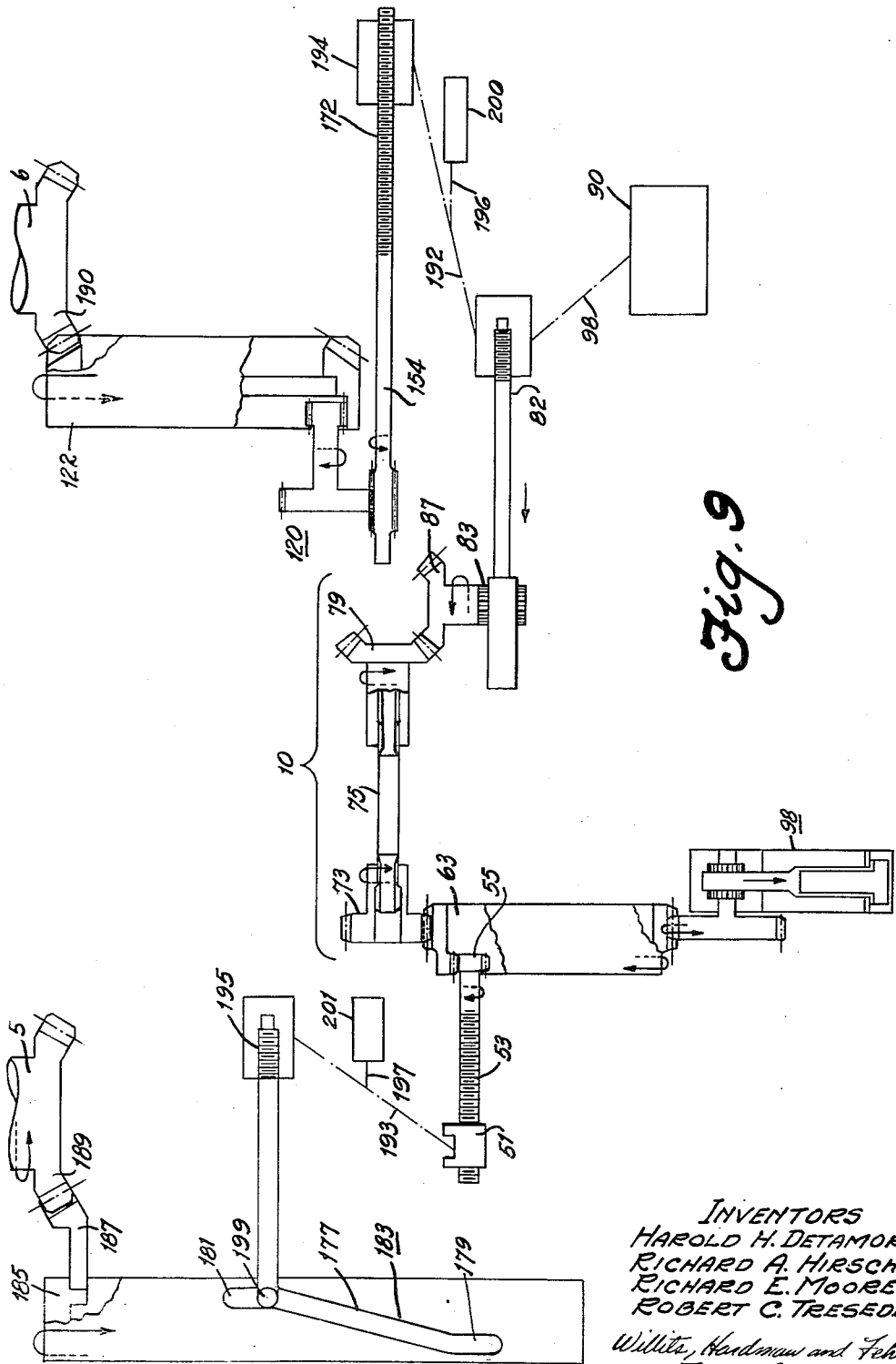
Fig. 9 is a schematic view of the coordinating mechanism between and in the propeller elements.

Referring to Fig. 9 the coordinating mechanism between the inboard and outboard propeller including the interpropeller means 10 will now be described in detail. In Fig. 9 the direction of rotation shown by the arrows associated with various elements of the coordinating system indicates the direction of rotation of the blades toward the feathered position. Blade 6 of the inboard propeller element is shown having an integral bevel gear 190 meshing with the master bevel gear 122 which, in turn controls the movements of the feed back shaft 154 thru the feed back mechanism 120 aforedescribed. The actuator piston 90 is shown in block form as having a mechanical connection which represents lever 98, with the master shaft 82. The master shaft, in turn actuates a mechanical linkage 192 which is connected at one end to the master shaft and at the other end to a member 194 which threadedly engages the high lead screw 172 formed on one end of the rotary feed back shaft 154. Intermediate its ends the mechanical linkage 192 has operative connection by means of linkage 196 with the distributor valve 200 of the inboard regulator. Likewise the master shaft 82 meshes with the pinions 83 which transmits movements through the gears 87 and 79 to the shaft 75 which, in turn, transmits motion to the coupling 73. The coupling 73 in turn transmits movement of the master shaft 82 to ring gear 63 which transmits the motion to the pinion 55 and the high lead screws 53 within the outboard regulator 7. The anti-back lash mechanism 89 aforedescribed is shown as having operative connection with the ring gear 63.

The control ring 51 threadedly engaged with the high lead screw 53 actuates a mechanical linkage 193 which is connected at its other end to a feed back shaft 195 associated with the outboard propeller element. Intermediate its ends the linkage 193 is connected by linkage means 197 to a distributor valve 201 within the outboard regulator. An outboard blade 5 is shown having an integral bevel gear 189 which, in turn, meshes with a master blade gear 187 associated with the outboard propeller element. The master gear 187 is rigidly connected to a ring member 185 which is provided with a cam slot 183. The cam slot comprises two end portions 179 and 181 which have side walls parallel to the side walls of the ring 185 and are connected by an inclined slot 177. The feed back shaft 195 is provided with a cam follower 199 which is maintained in engagement with the cam slot 183.

By means of the cam follower mechanism 199, an adjustment can be made affording a slight differential in the blade angle position of the inboard and outboard propeller blades. By reason of the end portion 181 of the cam slot 183 having side walls which are parallel with the end walls of the ring 185, no axial movement will be transmitted to the feed back shaft 195 during engagement of the cam follower 199 with this portion of the cam slot. This assures full feather position if the outboard propeller. Thus, the feed back shaft will not reposition the linkages 193 and 197 which are operatively connected with the piston of the distributor valve 201. Hence, the blade angle position of the outboard propeller element will either be lesser or greater than the blade pitch position of the inboard propeller element, independent of the directions in which the blades are moved. Proportionate load distribution between inboard and outboard propeller elements is obtained by adjustment of cam follower 199.

The operation of the coordinating mechanism shown in Fig. 9 will now be described. If the actuator piston 90 is moved to the right as viewed in the drawing, the master shaft 82 will be moved to the left by reason of the lever 98 being pivoted intermediate its ends. Movement of the master shaft to the left will pivot linkage 192 clockwise about member 194 which is fixed when the blade 6 of the inboard propeller is not being moved by the torque units associated therewith. Movement of the linkage 192 will effect movement of the piston of the distributor valve 200 thru the linkage 196. Movement of master shaft 82 to the left will effect movement of the bevel gear 87 in the direction of the arrow. Bevel gear 79 will, in turn, be moved in a direction of the arrow and thru the interpropeller means 10 the high lead screw 53 will be rotated in the direction shown by the arrow. Rotation of the high lead screw in this direction will effect axial movement of the control ring 51 to the left as viewed in the drawing. Movement of control ring 51 to the left will effect clockwise movement of linkage 193 about the feed back shaft 195 of the outboard propeller element. Movement of the linkage 193 will effect movement of the piston of the distributor valve 201 through the linkage 197. In this manner, the pistons of the distributor valves 200 and 201, associated with the inboard and outboard propeller elements respectively, will be substantially coincidentally positioned by the actuator piston 90. Moreover, by reason of the similar construction of the distributor valves 200 and 201, fluid pressure will be distributed to the torque units associated with the inboard and outboard propeller elements to effect coincident pitch adjustment of the blades of both propeller elements. When the propeller blades have obtained the angle called for by the actuator piston 90, the respective feed back mechanisms associated with the inboard and outboard propeller elements will reposition the pistons of the inboard and outboard distributor valves to stop the flow of fluid to and from blade actuating torque units. In this manner the operation of both the inboard and outboard regulators is controlled by the position of the actuator piston. Specific embodiments of the fluid pressure control circuits of the inboard and outboard regulators as well as the governing and blade angle control means for operating the actuator piston 90 will now be described in detail.

Figure 10:
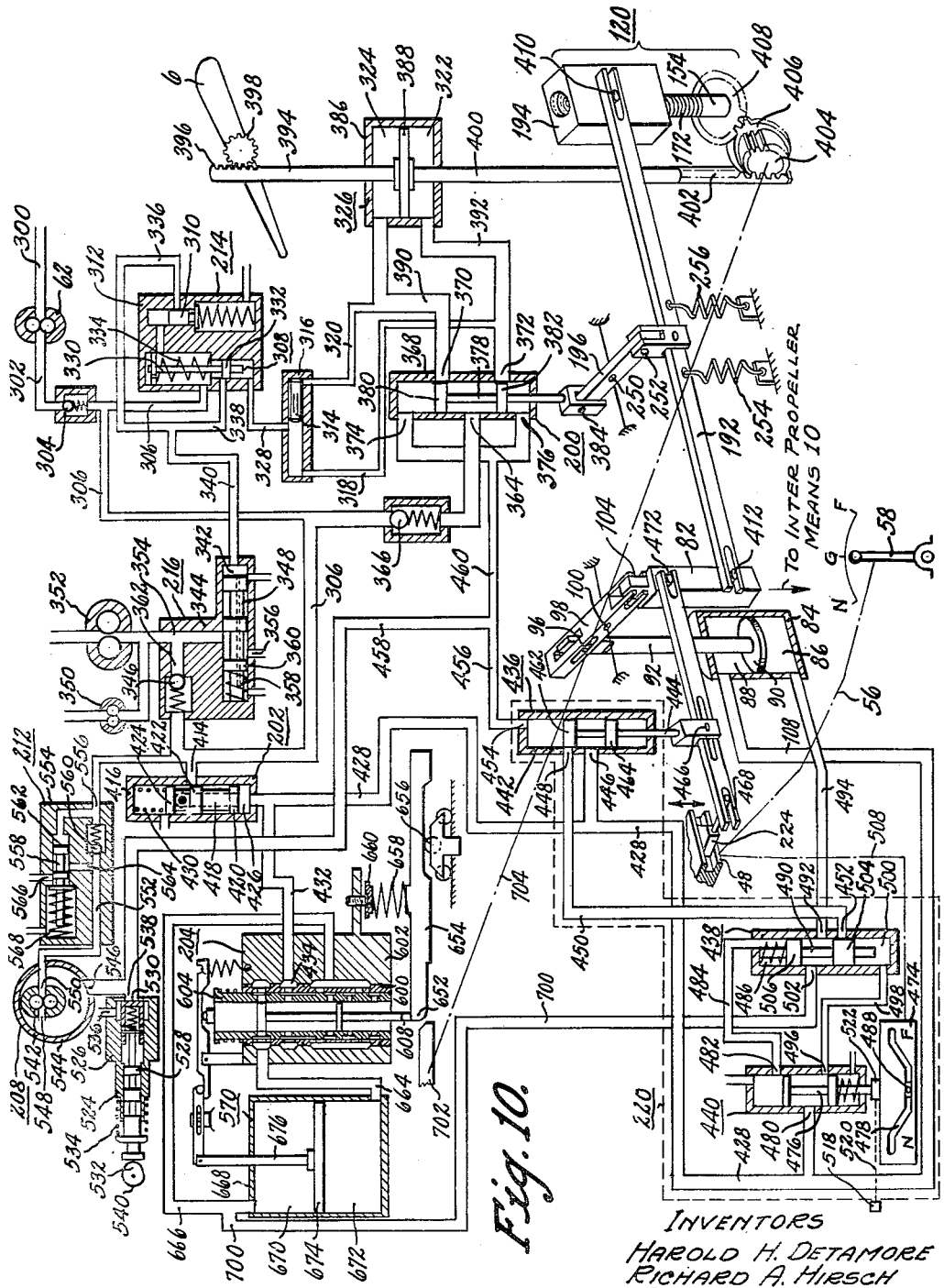
Fig. 10 is a schematic drawing of the fluid pressure system within the inboard regulator.

Referring to Fig. 10, system pump 62, having an inlet 300 and an outlet 302, supplies fluid under pressure to trunk line 306 through a check valve 304 which prevents flow from the line 306 back through the pump 62. Trunk line 306 communicates with the pressure control valve assembly 214, the pressure reducer valve 202, the feathering pump control valve 212, the flow control valve 216 and the distributor valve 200. The pressure control valve assembly 214 comprises an equal area valve 308 and a pressure relief valve 310, both of which are mounted in a common casing 312. Associated with the equal area valve 308 is a shuttle valve 314. The equal area valve is of the type described in the copending application, Ser. No. 37,624, filed July 9, 1948, Moore et al. The shuttle valve 314 is mounted in the casing 316 having its ends connected by passages 318 and 320 to the decrease pitch chamber 322 and the increase pitch chamber 324 of a blade actuating torque unit or servomotor 326. The shuttle valve 314 functions to direct the highest torque unit pressure, either from the decrease pitch chamber 322 or from the increase pitch chamber 324 to the equal area valve 308 through passage 328. The equal area valve 308 determines the operating pressure of pump 62 by demanding from the pumping system a pressure equal to that required to actuate the torque unit 326 plus a constant additional pressure sufficient to give the maximum rate of pitch change.

The equal area valve generally comprises a plunger 330 having a piston 332 at one end thereof, one side of which is exposed to the greatest pressure present in the torque unit 326 and the other side is exposed to the pressure developed by pump 62. A spring 334 always urges the plunger 330 in the same direction that the torque unit pressure tends to move the plunger. Moreover, as the equal area valve 308 is acted upon by centrifugal force, the pressure this valve demands is equal to the torque unit pressure plus a pressure equivalent to the spring and centrifugal loads imposed on the valve plunger 330. The pressure relief valve 310 merely functions as a safety valve to prevent excessive pressure in the system.

Drain lines 336 from the pressure relief valve 310, and 338 from the equal area valve 308, are connected and the drain flow from these valves passes through line 340 into a servo chamber 342 in the flow control valve 216. The flow control valve 216 comprises a housing 344 having mounted therein a check valve 346 and a servo actuated plunger valve 348. This valve is also similar to the flow control valve disclosed in the copending Moore application, previously referred to. The function of the flow control valve is to port into the trunk line 306 two auxiliary pumps 350 and 352 when the system pump 62 is unable to supply the flow required for high pitch change rates. When the pressure flow supplied by system pump 62 is sufficient to meet the requirements of the torque unit 326, either or both, the equal area valve and the pressure relief valve of the pressure control valve assembly 214 will supply drain flow to passage 340 and the servo chamber 342. This drain flow will move the plunger 348 of the flow control valve 216 to the left into the position it is shown in Fig. 10. With the plunger 348 in this position, pumps 350 and 352 will supply fluid pressure to passage 354 of the flow control valve 216 which will then flow to drain through port 356 in the housing 344. However, if there is no drain flow from the pressure control valve 214, spring 358 will move the plunger 348 to the right as viewed in Fig. 10. When the plunger 348 is moved to the right, land 360 will close port 356 and the flow from the pumps 350 and 352 will then flow from passage 354 to passage 362 and through the check valve 346 into trunk line 306.

Trunk line 306 communicates with supply port 364 of the distributor valve 200 through a check valve 366. Distributor valve 200 comprises a valve guide 368 having a pair of distribution ports 370 and 372 intermediate its ends and a pair of drain ports 374 and 376 at its ends. Within the valve guide 368, a plunger 378 having a pair of spaced lands 380 and 382 which cooperate respectively with ports 370 and 372, is mounted for reciprocal movement. The rod of the plunger 378 extends through an opening in the valve guide and is pivotally connected at 384 to one end of the lever 196. Lever 196 is pivoted intermediate its ends at 250 and at its other end 252 is pivoted to link 192. Distribution ports 370 and 372 are connected by lines 390 and 392 to the increase pitch chamber 324 and the decrease pitch chamber 322 of the torque unit respectively. The torque unit 324 is schematically shown as comprising a cylinder 386 within which is disposed a piston 388 mounted for reciprocal movement. The piston 388 divides the cylinder 386 into increase and decrease pitch chambers and is operatively connected by a rod 394 at one end to the blade 6 of the inboard power element. The rod 394 is provided with a rack 396 at one end which cooperates with a pinion gear 398 secured to the blade 6 by which means the pitch position of the blade 6 is adjusted upon reciprocal movement of the piston 388 and the rod 394.

The feed back mechanism 120, described in detail in connection with Figs. 4 and 7, is shown schematically in Fig. 10 as comprising a second piston rod 400 having a rack 402 at one end thereof which meshes with a pinion gear 404 provided with an integral bevel gear 406 which meshes with a bevel gear 408 shown as attached to the rotary feedback shaft 154. The shaft 154 is provided with high lead screw portion 172 which threadedly engages the member 194 that moves axially upon rotation of the shaft 154. Member 194 is pivotally connected at 410 to one end of link 192. Intermediate the ends of link 192, a pair of tension springs 254 and 256 are connected to link 192 on opposite sides of link 196. The other end of link 192 is pivotally connected at 412 to the master shaft 82 which is actuated by lever 98. One end of lever 98 is pivoted at 104 to the master shaft 82 and the other end of lever 98 is pivoted at 96 to the rod 92 of the actuator piston 90. Intermediate its ends, lever 98 is pivoted at 100 to a portion of the housing as shown in Fig. 2A.

The trunk line 306 communicates with port 414 of the pressure reducer valve 202 which comprises a housing 416 having disposed therein a plunger 418. Plunger 418 is provided with a plurality of lands 420, 422 and 424. Within the plunger 418 an axial passage, opening at one end to the annular chamber between the lands 422 and 424 and at the other end to a chamber 426 within the housing 416, conducts fluid under reduced pressure into reduced pressure trunk line 428. High pressure from the trunk line 306 is reduced by the pressure reducer valve 202 by reason of the land 422 restricting the port 414 fluid pressure in line 428 acting on one end of plunger 418 against the spring 430. The spring load contacts the pressure in line 428.

Reduced pressure trunk line 428 communicates through line 432 to the supply port 434 of the governor valve assembly 204. Trunk line 428 also communicates with the supply ports of the various elements of the blade angle control valve assembly 220 which comprises the valve elements within the dash lines of Fig. 10.

The blade angle control valve assembly 220 comprises a beta control valve 436, a selector valve 438 and a selector control valve 440. The beta control valve comprises a housing 442 within which is disposed a plunger 444 mounted for reciprocal movement therein. The housing 442 has a pressure supply port 446 which is connected to the reduced pressure trunk line 428, a distribution port 448 which is connected by means of line 450 to a supply port 452 of the selector valve 438 and a drain port 454 is connected by lines 456 to a drain line 458. Drain line 458 is also connected by line 460 with the drain ports 374 and 376 of the distributor valve 200. The plunger 444 has a pair of spaced lands 462 and 464 adjacent one end thereof and the other end of the plunger is pivotally connected at 466 to an intermediate portion of a lever 468. The lever 468 is operatively connected at one end with a shoe 224 which rides in the control ring 48 of the inboard regulator 8. The other end of lever 468 is pivoted at 472 to the master shaft 82. As schematically shown in Fig. 5, the control ring 48 is movable vertically in both directions relative to the valve housing 442 so as to effect movement of the plunger 444. The structural embodiment of this mechanism is shown in Fig. 5, wherein the lever 468 is movable in and out of the plane of the drawing by actuation of either the master control shaft 82 or the control ring 48, which movement is transmitted to the plunger 444 of the selector control valve 444 by any suitable means, not shown.

Also operatively connected with the control ring 48 of the inboard regulator 8 is a cam plate 474 which is connected to a plunger 476 of the selector control valve 440. The cam plate 474 is provided with a cam slot 478 which, when it is in its extreme positions of movement, positions plunger 476 so that reduced fluid pressure from trunk line 428 may flow from supply port 480 through port 482 and line 484 to a servo chamber 486 of the selector valve 438. The plunger 476 is provided with a cam follower 488 which rides in the cam slot in plate 474.

When the plunger of the selector control valve 440 is positioned by the cam plate 474 so that reduced fluid pressure is communicated through ports 480 and 482, line 484 to the chamber 486 of the selector valve 438, it will act to move plunger 490 downwardly as viewed in Fig. 10. When plunger 490 is moved downwardly, supply port 452 from the beta control 436 is placed in communication with a distributor port 492 of the selector valve 438, port 492 being connected by line 494 to the increase pitch chamber 86 of the actuator cylinder 84. However, when the plunger of the selector control valve 440 is in the position it is shown in Fig. 10, reduced fluid pressure from trunk line 428 will flow through ports 480 and 496 of the selector control valve through line 498 and into servo chamber 500 of the selector valve 438. In this instance, the plunger 490 of the selector valve will be urged upwardly to the position it is shown in Fig. 10. In this instance, supply port 502 of the selector valve will be in communication with distribution port 492 and supply port 452 of the selector valve will be blocked by land 504 of plunger 490. When the plunger 490 is in the downward position as aforedescribed, land 506 blocks supply port 502 from communication with distribution port 492. When the selector valve 438 is in the position shown in Fig. 10, the governor valve assembly 204 controls the application of reduced fluid pressure from line 432 to the increase pitch chamber 86 of the actuator cylinder 84.

Control ring 48 is shown diagrammatically as connected by mechanical linkage 56 to the pilot control lever 58. Control ring 48 is also shown connected by linkage 508 to the cam plate 474. Propeller control in the blade angle control regime is effected by an external adjustment on the selector control valve 440, by means of member 518, linkage 520 and member 522, Fig. 10. When the control lever 58 is manipulated, the plunger of the selector control valve 440 is only positioned to allow communication between ports 480 and 482 in the extreme positions of movement designated by the letters N and F. The intermediate range between the letters N and F is the governing range indicated by letter G and within this range the actuator is controlled by the governor valve assembly 204 which will be described later.

When the control lever is manipulated, and is moved to the position designated by the letter F, calling for operation in the feathered regime, an additional source of fluid pressure comprises the electric motor driven feathering pump 208 shown in Figs. 5 and 10. Even though the lever 58 is moved to the position designated by the letter F, the feathering pump will not be operative until the speed of rotation of the propeller elements has been reduced to an R. P. M. at which the system pumps 62, 350 and 352 will be unable to supply the pressure required by the torque unit 326. The means for determining this particular R. P. M. is the centrifugal switch 206 shown in Fig. 5. The centrifugal switch is of conventional design as disclosed in copending application, Serial No. 202,612, Treseder, filed December 26, 1950, and operates to energize the feathering pump motor circuit at approximately 300 R. P. M. In order to insure an adequate supply of hydraulic fluid for the feathering pump motor, a plurality of valve assemblies, one of which is designated by 524 in Fig. 10, are mounted within the inboard regulator 8. These valve assemblies are disposed substantially 120° apart and are three in number. By this disposition of the valve assemblies 524, one of them will always be submerged in the hydraulic fluid in the reservoir 42 of the inboard regulator 8 when the regulator is not rotating. The valve assembly 524 comprises a valve guide 526 having mounted therein for reciprocal movement a plunger mechanism 528. One end of the plunger 528 is operatively connected with a valve element 530 and the other end of the plunger 528 is moved axially in the valve guide 526 by means of a cam 532 which is driven upon rotation of the inboard regulator 8. The cam 532 is so disposed that, when the valve assembly 524 is submerged within hydraulic fluid in the reservoir 42, shown in Fig. 2A, a spring 534, which maintains the plunger in engagement with the cam 532, will move the plunger 528 to the left as viewed in Fig. 10 and allow communication between intake port 536 in the valve guide 526 and outlet port 538. This occurs by reason of the fact that a low portion 540 of the cam is in engagement with the end of valve plunger 528 when the valve assembly 524 is submerged on the hydraulic fluid within the reservoir 42. Thus, an adequate supply of fluid is always maintained for the feathering pump 542 which is disposed within casing 544. Further, means are provided for priming the pump 542 comprising drain line 458 which communicates with the interior of the casing 544 through port 546.

The feathering pump 542 has an inlet at 548 and an outlet at 550 which communicates with a passage 552 in the feathering pump control valve assembly 212. The feathering pump control valve assembly comprises a housing 554 having a port 556 in communication with high pressure trunk line 306. Within the housing 554 are disposed a relief valve 558 and a check valve 560. If, upon a reduction in the rotative speed of the propeller below 300 R. P. M., sufficient pressure is present in trunk line 306, this pressure will be communicated through port 556 to servo chamber 562 of the feathering pump control valve assembly 212. Pressure in servo chamber 562 will act to thrust the plunger 558 to the left, as viewed in Fig. 10, to allow communication between passages 564 and 566 of the housing 554. When passages 564 and 566 are in communication, fluid pressure developed by pump 542 flows to drain. However, when the pressure in trunk line 306 is insufficient to move the plunger to the left, a spring 568 will move the plunger 558 to the right as viewed in Fig. 10. In this instance, communication between passages 564 and 566 is blocked and fluid pressure developed by pump 542 will flow through check valve 560 and into high pressure trunk line 306.

Referring particularly to Figs. 10, 11 and 12 of the drawings, the governing means will be described in detail. The governing means includes the governor valve assembly 204 and a servomotor 570. The governor valve assembly comprises a stationary valve guide 600 mounted within a bore of a supporting member 602 which is fastened to the front plate 26 of the inboard regulator as shown in Fig. 5. Disposed within the bore of the stationary valve guide 600 is a movable valve sleeve 604 having a bore 606 within which is disposed a movable valve plunger 608. The valve guide 600 is provided with a plurality of ports each comprising a series of openings disposed throughout the circumference of the valve guide. These ports comprise a distribution port 610, the pressure supply port 434 and a second set of distribution ports generally indicated by 612. Referring particularly to Figs. 11 and 12 of the drawings, the series of ports designated by 612 comprise a first series of ports 616, a second series of larger ports 618 and a third series of smaller ports 620. Distribution ports designated collectively as 612 communicate with an annular channel 622 in the supporting member 602. Likewise, the ports 434 and 610 each communicate with annular channels 624 and 626 in the supporting member 602, respectively.

The valve sleeve 604 disposed within the bore of stationary valve guide 600 is provided with a plurality of ports likewise comprising a set of openings disposed around the circumference of the sleeve. These ports comprise a pressure distribution port 628, a pressure supply port 630, pressure distribution ports 632 and 634 and a drain port 636. In addition, each of the ports in the valve sleeve 604 communicates with an annular groove in the outer circumferential surface of the sleeve. In this manner, port 628 communicates with annular groove 638, port 632 communicates with annular groove 642, port 634 communicates with annular groove 644 and port 636 communicates with annular groove 646. The plunger 608 is provided with a pair of spaced lands 648 and 650. Land 648 cooperates with port 628 of the valve sleeve 604 while the land 650 serves as a separator between ports 632 and 634 of the valve sleeve. The plunger is pivotally connected at 652 to a lever 654 which is, in turn, supported at one end by a jittered fulcrum 656. The jittered fulcrum functions to eliminate static friction between the plunger 608 and the sleeve valve 604 during rotation of the inboard regulator 8. Intermediate the ends of lever 654, a compression spring 658, disposed between the lever and an adjustable backing plate 660, is mounted to oppose the thrust of centrifugal force tending to move the valve plunger 608 and the lever upwardly about the jittered fulcrum 656. A screw device 662 is provided for adjusting the load on spring 658 to vary the speed setting for which the valve assembly 204 will govern. Thus, in the instant governing means, the speed setting can be varied by an internal adjustment within the regulator 8, and an external adjustment of lever 58. Lever 58 operates ring 48 which changes the position of member 660. This is feasible in the present invention due to the fact that the prime mover used to drive the propeller is a turbine which operates most efficiently at one particular speed.

Channel 626 communicates with line 664 and channel 622 communicates with line 666. Lines 664 and 666 communicate with opposite ends of a cylinder 668 which forms part of the servomotor 570. Disposed within the cylinder 668 and dividing it into two chambers 670 and 672, is a piston 674 which is mounted for reciprocal movement therein. The piston is connected by means of a rod 676 extending through the chamber 670 and through an aperture in the end wall of cylinder 668, to a lever 678. The lever 678 is provided intermediate its ends with a movable fulcrum 680, and is connected at one of its ends 682 with the piston rod 676 and at its other end 684 is provided with a cam roller 686 which is operatively associated with one end 688 of a second lever 690. The lever 690 is pivoted at 692 to the governor valve assembly supporting member 602, and at its other end a compression spring 694 maintains lever end 688 in engagement with roller 686. Between the pivotal connection 692 of the lever and the end of the lever associated with spring 694, lever 690 is provided with a cam surface 696 which cooperates with a cam follower 698 that is rigidly connected to the sleeve valve 604. Line 666 is provided with a branch 700 which communicates with supply port 502 of the selector valve 438. In addition, a lineally movable cam member 702, actuated by mechanical linkage 704, connected to the rotary feedback mechanism 120, shown in Fig. 10, is provided with a cam surface 706 which is adapted to engage the lever 654 and urge the plunger 608 upwardly if an angle lower than a predetermined minimum low angle is reached by the blades 6. This low angle may be a positive 10°, which represents the minimum low angle at which sufficient force is produced by the propellers to maintain the aircraft self-sustaining when it is in flight. If an angle lower than 10° is reached by the blades when the control 58 is in the governed speed regime of operation, the cam member 702 will urge the plunger 608 upwardly which will result in fluid pressure being applied to the increase pitch chamber 324 of the torque unit 326 in a manner to be described. This action will result regardless of the fact that the governing means may be demanding lesser blade angle to maintain the predetermined governing speed. Thus the lower pitch stop effected by the cam member 702 and the plunger 608 is a safety feature which is automatically operable when the governed speed regime of operation is selected by the pilot.

When there is no speed error, that is, when the propeller elements are rotating at precisely the speed at which the governing means is set, the lever 654 will be in an equilibrium position as determined by the opposing forces of spring 658 and the thrust of centrifugal force. When the lever is in this equilibrium position, lands 648 and 650 of the plunger 608 will be in the position that is shown in Figs. 10 and 11. Thus, land 648 will block communication between port 630 and port 628 and low pressure fluid from line 432 will not be communicated through line 664 to chamber 672 of the servomotor 570. Likewise, lands 708 and 710 of the sleeve valve 604 will block communication between ports 630, 632 and 634 with the ports, 616, 618 and 620. Hence low pressure fluid will not be supplied to or drained from line 666. However, if there is an underspeed error, centrifugally actuated valve plunger 608 moves down in which instance, chamber 672 of the servomotor 570 is connected to drain through line 664, port 628 and bore of the valve sleeve 604. As the piston 674 disposed within the servomotor 668 is of unequal area, the smaller area being exposed to the fluid pressure in chamber 670 and the larger area being exposed to the pressure in chamber 672, the piston 674 will move downwardly under the urge of a substantially constant pressure that is maintained in chamber 670 by means to be described later. Downward movement of piston 674 will likewise effect downward movement of rod 676 which will move lever 678 about its pivot 680. Downward movement of the rod 676 will effect an upward movement of the end of lever 684 provided with the roller 686. As lever 690 has its end 688 maintained in engagement with the roller 686 by means of the spring 694, lever 690 will likewise pivot about 692. The end 688 of the lever 690 will move upwardly and cam portion 696 of the lever will move downwardly. Downward movement of the cam portion 696 of the lever will act on cam follower 698 and move the sleeve valve 604 downwardly, thereby compressing spring 712 which is mounted between the stationary valve guide 600 and a flange 714 on the movable sleeve valve 604. Thus, the sleeve valve 604 will move down following up the downward movement of the plunger 608.

Referring particularly to Figs. 2A and 10, the actuator piston 90 is of unequal area, the smaller area being exposed to the pressure in the decrease pitch chamber 88 and the larger area being exposed to pressure in the increase pitch chamber 86. The decrease pitch chamber 88 is continuously supplied through line 108 and trunk line 428 with low pressure fluid. Movement of the piston 90 is effected by supplying low pressure fluid to, or allowing drain from the increase pitch chamber 86 which pressure acts on the larger area of the piston 90. As is seen in Fig. 2A, the actuator cylinder and piston are mounted on the inboard regulator in such a manner that they will not be effected by centrifugal force due to rotation of the inboard propeller element. Thus, when the servo motor piston 674 moves downwardly by reason of chamber 672 being connected to the drain when the plunger 608 responds to an underspeed condition, the following sequence of fluid flow from the increase pitch chamber 86 of the actuator will occur. As the piston 674 moves downwardly, as viewed in Fig. 11, fluid will flow from the increase pitch chamber 86 through lines 494 and 700 and into the servo motor chamber 670. This drain flow from the actuator chamber 86 to the servo motor chamber 670 caused by downward movement of the piston 674 and effected by the constant pressure applied to chamber 88 of the actuator, is termed deceleration decrease flow, since the movements of piston 674 are proportional to the rate of change of speed error.

Downward movement of the sleeve valve 604 effected by the rod 676 and levers 678 and 690 will expose port 616 to the low pressure line 432 through annular channel 640 and port 434 and will simultaneously expose large port 618 to drain through annular channel 644 and port 634. The relative areas of the ports 616 and 618 are such that a differential flow will be established within annular channel 622, and as the larger area port 618 is exposed to drain fluid will flow from line 666 to annular channel 622 and through ports 618 and 634 to drain. This drain flow will likewise come from chamber 86 of the actuator through lines 494 and 700. As plunger 608 is moved in response to the amount of speed error and the sleeve valve 604 follows the movement of the valve plunger, the drain flow through port 634 from line 666 is termed underspeed decrease drain flow. When the valve sleeve 604 has followed up the movement of the plunger 608 to a point where land 648 closes port 628, the deceleration decrease drain flow will stop. However, as the valve sleeve is still in a downward position, the underspeed decrease drain flow will continue through port 634. Exposing chamber 86 of the actuator to drain will cause movement of the piston 90, under the urge of low pressure fluid supplied to chamber 88, downwardly as viewed in Fig. 10. Thus movement of the plunger 90 will effect a downward movement of the distributor valve plunger or piston 382 through the linkage including rod 92, lever 98, master shaft 82, linkage 192 and lever 196. Downward movement of the plunger 378 will connect decrease pitch chamber 324 of the torque unit to drain through line 390, port 370, port 374, line 460 and line 458, and will connect decrease pitch chamber 322 to the high pressure trunk line 306 through ports 364, 372 and line 392. Piston 388 of the torque unit will then move upwardly as viewed in Fig. 10 to effect a decrease in the pitch position of the blade 6. Decreasing the pitch of the blade 6 will tend to correct the underspeed and the propeller will accelerate towards an on-speed condition. Acceleration of the inboard propeller element 2 likewise will cause acceleration of the inboard regulator 8 which houses the governor valve assembly 204. As the propeller element speed increases, the valve plunger 608 will move upwardly thereby exposing port 628 of the valve sleeve to port 630 and low pressure fluid will be supplied through line 664 to chamber 672 and servo motor 570. Pressure supplied through chamber 672 will move the piston 674 upwardly and fluid from chamber 670 will flow into line 700 and through line 494 to the increase pitch chamber 86 of the actuator. This flow is termed acceleration increase flow and is simultaneous with the drain decrease flow from the actuator chamber 86 through lines 700 and 666 and through port 634 of the valve guide to drain. As the speed of rotation of the propeller approaches an on-speed condition, the propeller acceleration will stop and likewise the acceleration flow from the chamber 670 will stop. Moreover, upward movement of the piston 674 will act through rod 676 and levers 678 and 690 to cause a follow up movement of the valve sleeve 604 in an upward direction under the urge of spring 712. When the on-speed condition has been reached by the propeller, there will be no oil flow to or from the actuator chamber 86 as the governor valve assembly will again be in the position it is shown in Fig. 11. Thus, it is apparent that during an under-speed condition, the combined rate of flow through ducts or lines 700 and 494 is proportional to the speed error and to the rate of change of speed error. In this manner, actuator piston 90 moves to effect blade angle decrease at a rate proportional to speed error and the rate of change of speed error.

When an overspeed condition exists, the action of the governor valve assembly 204 and the servomotor 570 is reversed. In an overspeed condition the valve plunger 608 moves under the urge of centrifugal force in relation to the movable valve sleeve 604, thereby allowing fluid to flow through port 628 and line 664 to the chamber 672 of the servo motor 570. This fluid flow moves the piston 674 upwardly as viewed in Fig. 11 which, in turn, through the levers 678 and 690, effects a follow up movement in the valve sleeve 604. As the piston 674 moves it forces fluid at a rate proportional to the rate of change of speed error into the line 700 which flows through line 494 into the increase pitch chamber 86 of the actuator. This acceleration increase flow continues until the sleeve valve 604 has completely followed up the movement of the plunger 608. At this time the acceleration increase flows are shut off but the overspeed increase flow established by the differential area of the ports 616 and 620 which are respectively exposed to the supply port 632 and the drain port 636, continues as the sleeve valve 604 is in an offspeed condition. As the propeller element approaches the onspeed position, the valve plunger 608 likewise approaches an onspeed equilibrium position and a reverse in the sequence of preceding steps transpires.

The rate of change of blade angle correction proportional to the amount of speed error can be varied by substituting a spring 658 having a different rate. The rate of blade angle correction proportional to the rate of change of speed error can be varied by moving the fulcrum point 680 of the lever 678. Adjustment of the fulcrum point 680 can easily be made externally of the propeller regulator 8 by means of a mechanical linkage 716 which may be connected with a suitable adjustment means mounted on the regulator governor, not shown, for effecting lineal movement of the fulcrum point 680.

Referring to Fig. 13 of the drawings, the fluid pressure system contained within the outboard regulator 7 is shown in diagrammatic form. The system within the outboard regulator 7 is of much simpler design than that of the inboard regulator, as the outboard regulator merely responds to the dictates of the master shaft 82 under the control of the actuator within the inboard regulator. Thus, a detailed description of the outboard regulator fluid pressure system is deemed unnecessary briefly, the fluid pressure circuit comprises system pumps 57, 301 and 303, all of which are continuously operable during propeller rotation and pumps 57 and 301 supply fluid under pressure through check valves 305 and 307 respectively into high pressure trunk line 309. A flow control valve 311 ports the additional pump 303 into the high pressure trunk line 309 through check valve 313 when the pumps 57 and 301 do not produce sufficient flow under pressure to satisfy the demands of an outboard torque unit 325. Likewise a pressure control valve assembly 315 having an equal area valve 317, a pressure relief valve 319 and a shuttle valve 321 performs the same function as the like elements within the inboard regulator 8. Moreover, an electric motor operated feathering pump 323, a feathering pump control valve 325a and a check valve 327 for the feathering pump under housing are provided in the outboard regulator 7. The check valve 327 acts as a relief valve for the drain line 351 and an inlet valve for the pump. High pressure trunk line communicates with the distributor valve 201 which is basically the same design as the inboard distributor valve 200. The distributor valve 201 within the outboard regulator 7 comprises a valve guide 329 having a pressure supply port 331, a pair of distribution ports 333 and 335, and a pair of drain ports 337 and 339. Within the bore of the valve guide 329 is mounted a valve plunger 341 having a plurality of spaced lands 343, 345, 347 and 349. The lands 345 and 347 cooperate respectively with the distribution ports 333 and 335. The lands 343 and 349 merely serve as a means assuring drain flow through either ports 337 and 339 and into line 351 which is connected with the inlet of the feathering pump 323. The plunger 341 is pivotally connected at 353 to a lever 357 having a fixed fulcrum at 359. One end of lever 357 is connected to a spring mechanism 361 which maintains the lever 357 against the fulcrum 359. The other end of lever 357 is provided with a cam surface 363 which engages an intermediate portion 197 of the lever 193 shown in Figs. 9 and 13. One end of the lever 193 is operatively connected to the blade feedback rod 195 which is actuated by the mechanism shown in Fig. 9. The other end of lever 193 rides in a yoke 365 which is integral with a control shoe 367 that rides in the control ring 51 mounted within the outboard regulator 7. Thus, as was described in connection with Fig. 9, the control ring 51 within the outboard regulator 7 is actuated by the interpropeller means 10 from the master shaft 82.

Distribution port 333 of the distributor valve 201 is connected by lines 369 to an increase pitch chamber 371 of the outboard torque unit 325. Distribution port 335 of the distributor valve is connected by line 373 to a decrease pitch chamber 375 of the torque unit. The torque unit 325 is diagrammatically shown in Fig. 13 as comprising a cylinder 377 having a piston 379 mounted for reciprocal movement therein. The piston 379 is connected by rod 381 which is provided with a rack 383 that meshes with a pinion 385 secured to the blade 5 of the outboard propeller element 1.

A resumé of the operation of the propeller mechanism of the present invention will now ensue. With the manual control lever 58 in a position selecting a governed speed regime, the governor valve assembly 204 and the servomotor 570 will cojointly control the flow of fluid to and from the increase pitch chamber 86 of the actuator. The actuator will, in turn, effect coincident movement of the distributor valve plungers in both the inboard and outboard propeller elements to effect substantially coincident adjustment in the pitch position of the inboard and outboard propeller blades. When the blade angle adjustment called for by the actuator has been obtained by the blades, the respective feedback mechanisms associated with each propeller element will reposition the distributor valve plunger so as to cut off the flow of fluid to and from the blade actuating torque units. When the pilot selects the negative regime of operation, the selector control valve 440 is actuated which, in turn, actuates the selector valve 438 and blocks communication between the actuator chamber 86 and the governing means. At the same time the selector valve will place the distribution port of the beta control valve 436 in communication with the actuator cylinder 86. As the control lever 58 is positioned in the position marked N, the beta control valve plunger 444 will be moved downwardly by means of the lever 468 and the associated linkage 56 operated by the control lever. In this instance chamber 86 of the actuator will be connected to drain through line 494, port 492, port 452, line 450, ports 448 and 454 and lines 456 and 458. The actuator piston 90 will move downwardly as viewed in Fig. 10 and will position the master shaft 82 to effect downward movements in the inboard and outboard distributor valve plungers 378 and 341, respectively. Fluid under pressure will then flow from the high pressure trunk lines of the inboard and outboard regulators to the decrease pitch chambers of the inboard and outboard torque units and move the blades 5 and 6 to a negative pitch position.

If the control lever 58 is moved to the feather position F, the action will be reversed. That is, the beta control valve plunger 444 will be moved upwardly and low pressure fluid from trunk line 428 will be transmitted to the increase pitch chamber 86 of the actuator causing upward movement of the actuator piston 90 as viewed in Fig. 10. The actuator piston 90 will effect movement of the master shaft 82 and move the plungers of the distributor valves in both the inboard and outboard regulators upwardly as viewed in Figs. 10 and 13 of the drawings. In this instance, the increase pitch chambers of the inboard and outboard torque units will be connected to the high pressure trunk lines and the decrease pitch chambers will be connected to drain. Thus, the torque units will move the blades 5 and 6 to the feathered position. The beta control valve 436 can control the flow of fluid to and from the actuator chamber 86 through the entire range of blade movement when the external adjustment of means 518, 520, and 522 is made on the selector control valve 440.

While the embodiment of the present invention as herein disclosed, constitutes a preferred form, it is to be understood that other forms might be adopted.

What is claimed is as follows:

1. In a contra-rotating propeller, a pair of hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect actuation of said power actuated means, control means in each regulator-hub combination including a follow-up connection with the propeller blades of that hub for controlling the application of said developed power to effect an adjustment in the pitch position of said blades, and means rotatable with one of said hubs and operatively connected with the control means within each regulator-hub combination for actuating and coordinating the actuation of said control means in both regulator-hub combinations to coordinate the pitch adjustment of the blades of said two hubs, said last recited means including a power device operable by the developed power in the regulator rotatable with said one hub.

2. In a contra-rotating propeller, a pair of hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect actuation of said power actuated means, control means in each regulator-hub combination including a follow-up connection with the propeller blades of that hub for controlling the application of said developed power to effect an adjustment in the pitch position of said blades, and means rotatable with one of said regulator-hub combinations and operatively connected with the control means within each regulator-hub combination including an actuator operatively connected to a master shaft for actuating and coordinating the actuation of said control means in both regulator-hub combinations to coordinate the pitch adjustment of the blades of said two hubs, said actuator being operable by the developed power in the regulator of said one regulator-hub combination.

3. In a contra-rotating propeller, a pair of hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect actuation of said power actuated means, control means in each regulator-hub combination including a follow-up connection with the propeller blades of that hub for controlling the application of said developed power to effect an adjustment in the pitch position of said blades, actuating means rotatable with one of the regulator-hub combinations for the control means of both regulator-hub combinations, mechanism operatively interconnecting the actuating means and the control means of said one regulator-hub combination for effecting operation thereof, inter-propeller means operatively connected with the actuating means and the control means within the other regulator-hub combination for effecting operation of said control means in said other regulator-hub combination, and a master shaft operatively connected with the actuating means, said mechanism and the inter-propeller means for coordinating the actuation of the control means of both regulator hub combinations to thereby coordinate the pitch adjustment of the blades of said two hubs.

4. In a contra-rotating propeller, a pair of hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect actuation of said power actuated means, control means in each regulator-hub combination including a follow-up connection with the propeller blades of that hub for controlling the application of said developed power to effect an adjustment in the pitch position of said blades, inter-propeller means operatively connected with the control means within one regulator-hub combination for effecting operation thereof, a master shaft rotatable with the other regulator-hub combination and operatively connected with the control means thereof and with the inter-propeller means, and an actuator carried by one of said regulators, said actuator being operable by the developed power in said one regulator and operatively connected to said master shaft for effecting movements of the said master shaft to thereby coordinate the operation of the control means within both regulator-hub combinations.

5. In a contra-rotating propeller, a pair of hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect actuation of said power actuated means, control means in each regulator-hub combination including a follow-up connection with the propeller blades of that hub for controlling the application of said developed power to effect an adjustment in the pitch position of said blades, inter-propeller means operatively connected with the control means within one regulator-hub combination for effecting operation thereof, a master shaft rotatable with the other regulator-hub combination and operatively connected with the control means thereof and with said inter-propeller means for coordinating the actuation of the control means of both regulator-hub combinations, means carried by and rotatable with said other regulator-hub combination and operatively connected to said master shaft for actuating the said master shaft, and an anti-back lash mechanism associated with the operative connection between the control means of said one regulator-hub combination and said interpropeller means.

6. An engine-propeller combination including, a pair of axially spaced propeller hubs, each of which supports a propeller having a plurality of blades mounted for pitch adjustment, shaft means operatively connected with said hubs for rotating the said hubs in opposite directions, regulators rigidly attached to and rotatable with each of said hubs, means within each regulator for developing a source of fluid pressure, torque units mounted on said hubs and operatively connected with the propeller blades thereof for adjusting the pitch position of said blades, means interconnecting said sources of fluid pressure with said torque units, an actuator disposed within one of said regulators and rotatable therewith, means interconnecting the source of fluid pressure within said one regulator with said actuator, means associated with said last recited interconnecting means for controlling fluid flow to and from said actuator, and means operatively connected with said actuator and responsive to movements thereof for controlling the application of fluid pressure from said sources to the torque units of both hubs whereby adjustments in the pitch positions of the blades of both propellers are subservient to the movements of said actuator.

7. An engine-propeller combination including, a pair of axially spaced propeller hubs, each of which supports a propeller having a plurality of blades mounted for pitch adjustment, shaft means operatively connected with said hubs for rotating the said hubs in opposite directions, regulators rigidly attached to and rotatable with each of said hubs, means within each regulator for developing a source of fluid pressure, torque units mounted on said hubs and operatively connected with the propeller blades thereof for adjusting the pitch position of said blades, means interconnecting said sources of fluid pressure with said torque units, an actuator disposed within one of said regulators and rotatable therewith, means interconnecting the source of fluid pressure within said one regulator with said actuator, means associated with said last recited interconnecting means for controlling fluid flow to and from said actuator, means operatively connected with said actuator and responsive to movements thereof for controlling the application of fluid pressure from said sources to the torque units of both hubs whereby adjustments in the pitch positions of the blades of both propellers are subservient to the movements of said actuator, and means operatively connected with said last recited means for blocking application of fluid pressure from said sources to said torque units when the pitch adjustments dictated by said actuator have been effected by the blades of each propeller.

8. An engine-propeller combination including, a pair of axially spaced propeller hubs, each of which supports a propeller having a plurality of blades mounted for pitch adjustment, shaft means operatively connected with said hub for rotating the said hubs in opposite directions, regulators rigidly attached to and rotatable with each of said hubs, means within each regulator for developing a source of fluid pressure, torque units mounted on said hubs and operatively connected with the propeller blades thereof for adjusting the pitch position of said blades, means interconnecting said sources of fluid pressure with said torque units, a distributor valve in each of the means interconnecting said sources of fluid pressure with said torque units, an actuator disposed within one of said regulators and rotatable therewith, means interconnecting the source of fluid pressure within said one regulator with said actuator, means associated with said last recited interconnecting means for controlling fluid flow to and from said actuator, and means operatively connected with said actuator and responsive to movements thereof for positioning said distributor valves to control the application of fluid pressure from said sources to the torque units of both hubs whereby adjustments in the pitch positions of the blades of both propellers are subservient to the movements of said actuator.

9. An engine-propeller combination including, a pair of axially spaced propeller hubs, each of which supports a propeller having a plurality of blades mounted for pitch adjustment, shaft means operatively connected with said hubs for rotating the said hubs in opposite directions, regulators rigidly attached to and rotatable with each of said hubs, means within each regulator for developing a source of fluid pressure, torque units mounted on said hubs and operatively connected with the propeller blades thereof for adjusting the pitch position of said blades, means interconnecting said sources of fluid pressure with said torque units, a distributor valve in each of the means interconnecting said sources of fluid pressure with said torque units, an actuator disposed within one of said regulators and rotatable therewith, means interconnecting the source of fluid pressure within said one regulator with said actuator, means associated with said last recited interconnecting means for controlling fluid flow to and from said actuator, means operatively connected with said actuator and responsive to movements thereof for positioning said distributor valves to control the application of fluid pressure from said sources to the torque units of both hubs whereby adjustments in the pitch positions of the blades of both propellers are subservient to the movements of said actuator, and means operatively connected with the distributor valves in each regulator for repositioning the said valves to block application of fluid pressure from said sources to said torque units when the pitch adjustments dictated by said actuator have been effected by the blades of each propeller.

10. An engine-propeller combination including, a pair of axially spaced propeller hubs, each of which supports a propeller having a plurality of blades mounted for pitch adjustment, shaft means operatively connected with said hubs for rotating the said hubs in opposite directions, regulators rigidly attached to and rotatable with each of said hubs, means within each regulator for developing a source of fluid pressure, torque units mounted on said hubs and operatively connected with the propeller blades thereof for adjusting the pitch position of said blades, means interconnecting said sources of fluid pressure with said torque units, an actuator disposed within one of said regulators and rotatable therewith, means interconnecting the source of fluid pressure within said one regulator with said actuator, means associated with said last recited interconnecting means for controlling fluid flow to and from said actuator, a member operatively connected with said actuator and responsive to movements thereof, means connected to said member for controlling the application of fluid pressure from one of said sources to the torque units of one of said hubs, and inter-propeller means connected with said member for controlling the application of fluid pressure from the other of said sources to the torque units of the other of said hubs whereby adjustments in the pitch positions of the blades of both propellers are subservient to the movements of said actuator.

11. In combination with a variable pitch propeller of the type having an inboard propeller element and an outboard propeller element, each element having power actuated means for adjusting the pitch thereof and control means for the pitch adjusting means, and means for rotating the propeller elements in opposite directions; operating means carried by the inboard propeller element for positioning the control means of the inboard propeller element, means carried by and rotatable with the inboard propeller element for actuating said operating means, inter-propeller means operatively connected with said operating means for transmitting to the control means of the outboard propeller element the pitch adjustments dictated by said actuating means, said inter-propeller means including a gear train comprising a pinion gear drivingly connected to a first gear which meshes with a second gear, a shaft drivingly connected with said second gear, a coupling drivingly connected to said shaft, and means operatively connected to the control means of the outboard propeller element and said coupling and movable thereby for effecting operation of the control means of said outboard propeller element.

12. The combination set forth in claim 11 wherein the last recited means includes a second pinion gear drivingly connected to said coupling, a ring gear having internal and external teeth, said second pinion gear meshing with the external teeth of said ring gear, and gear means engaging the internal teeth of said ring gear.

13. The combination set forth in claim 12 wherein anti-back lash means operatively engage the external teeth of said ring gear to assure precise transmission of movement between said second pinion gear and said ring gear.

14. In combination with a variable pitch propeller of the type having a hub provided with a plurality of blade sockets adapted to receive and adjustably support a propeller blade and power actuated means carried by said hub for adjusting the pitch of said blades, a rotary feedback mechanism for de-energizing the power actuated means when the pitch adjustments dictated by means associated with the propeller have been effected by the blades, said rotary feed-back mechanism including a pair of coaxial members drivingly connected with said blades, a gear operatively connected with each of said members, common means drivingly connected with each of said gears, one of said members comprising a pre-stressed torsion shaft for eliminating backlash between said gears and said common means, and a rotary feed-back shaft operatively connected with said common means.

15. In combination with a variable pitch propeller of the type having a hub provided with a plurality of blade sockets adapted to receive and adjustably support a propeller blade and power actuated means carried by said hub for adjusting the pitch of said blades, a rotary feedback mechanism for de-energizing the power actuated means when the pitch adjustments dictated by means associated with the propeller have been effected by the blades, said rotary feed-back mechanism including a pair of coaxial members drivingly connected with said blades, said members comprising a hollow sleeve and a pre-stressed torsion shaft, a gear operatively connected with each of said members, a second hollow sleeve having a toothed portion in engagement with each of said gears, said pre-stressed torsion shaft eliminating backlash between said gears and said toothed portion, a rotary feed-back shaft operatively connected with said second hollow sleeve, and means including the connection between said second sleeve and said shaft for taking up any relative deflection occurring in the feed-back mechanism.

16. Governing apparatus for controlling the speed of a prime mover including, a source of fluid pressure, a servo cylinder having disposed therein a piston which divides said servo cylinder into rod and head end chambers, a valve assembly for controlling fluid flow from said source to said cylinder, said valve assembly including a valve guide having a supply port connected with said source and a pair of distribution ports, one of said distribution ports being connected with the head end chamber of said cylinder, and two cooperable valve elements, each movable relative to said valve guide for co-jointly controlling the connection between the source port and said distribution ports, means operatively connected to one of said valve elements for effecting movement thereof, means operatively connected to the other of said valve elements for effecting movement thereof, an actuator comprising a cylinder having disposed therein a piston which divides said actuator cylinder into rod and head end chambers, means operatively connected with said actuator piston and responsive to movements thereof for controlling the speed of said prime mover, passage means interconnecting the rod end chamber of the servo cylinder and the head end chamber of the actuator cylinder, and means interconnecting the other distribution port of said valve assembly with said passage means interconnecting the two cylinders whereby movements of said actuator piston are effected by combined flow of fluid from said servo cylinder and said valve assembly.

17. The combination set forth in claim 16 wherein the actuator piston is of unequal area, the smaller area portion of said actuator piston being continuously exposed to said source of fluid pressure, and the actuator cylinder chamber having the larger area of said actuator piston being connected to said interconnecting passage means so as to be exposed to the combined flow of fluid from said servo cylinder and said valve assembly.

18. The combination set forth in claim 16 wherein the piston of said servo cylinder is of unequal area, the larger area of said servo piston being exposed to fluid flow from said one distribution port, and the servo cylinder chamber having the smaller area of said servo piston being connected to the head end chamber of said actuator cylinder so as to be exposed to pressure from said actuator cylinder whereby movements of said servo piston are effected by the supply to or drain from the end of said servo cylinder cooperable with the larger area of said servo piston.

19. The combination set forth in claim 16 wherein the two cooperable valve elements comprise a valve plunger and a valve sleeve, and wherein the means operatively connected to one of said valve elements comprises a speed responsive mechanism, and the means operatively connected to the other of said valve elements includes said servo piston.

20. In a contra-rotating propeller, inboard and outboard propeller hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect operation of said power actuated means, control means in each regulator-hub combination including a follow-up connection with the propeller blades of that hub for controlling the application of said developed power to effect an adjustment in the pitch position of said blades, an actuator carried by and rotatable with the inboard regulator-hub combination, means within said inboard regulator for controlling the application of developed power in said inboard regulator to the actuator for effecting operation thereof, and means operatively interconnecting the control means of both regulator-hub combinations with the actuator for actuating and coordinating the actuation of the control means in both regulator-hub combinations to coordinate the pitch adjustment of the blades of the inboard and the outboard hubs.

21. The combination set forth in claim 20 wherein the last recited means include a member carried by the inboard regulator-hub combination and rotatable therewith, said member having operative connection with the actuator so as to be movable axially relative to the inboard regulator-hub combination, and a linkage interconnecting said member and the control means of said inboard regulator-hub combination whereby axial movement of said member will effect operation of the control means of said inboard regulator hub combination.

22. The combination set forth in claim 21 wherein the follow-up connection between the propeller blades of said inboard hub and the control means of said inboard regulator-hub combination includes a rotatable shaft operatively connected to the blades of said inboard hub and said linkage, the construction and arrangement being such that said follow-up connection will reposition the control means of said inboard regulator-hub combination when the pitch adjustment demanded by said actuator has been effected by said power actuated means.

23. The combination set forth in claim 20 wherein the last recited means includes a member carried by said inboard regulator-hub combination and rotatable therewith, said member being operatively connected to said actuator whereby operation of said actuator will effect axial movement of said member relative to said hubs, and inter-propeller means operatively connected with said member and with the control means of the outboard regulator-hub combination whereby axial movement of said member will effect operation of the control means in the outboard regulator-hub combination.

24. The combination set forth in claim 23 wherein the operative connection between said inter-propeller means and the control means of the outboard regulator-hub combination includes a linkage, and wherein the follow-up connection between the propeller blades of the outboard hub and the control means of the outboard regulator-hub combination includes an element operatively connected with said linkage and with said outboard propeller hub blades for repositioning the control means of the outboard regulator-hub combination when the pitch adjustment selected by said actuator has been accomplished by said power actuated means.

25. In a contra-rotating propeller, inboard and outboard propeller hubs adapted to be driven in opposite directions from a pair of oppositely rotating drive shafts, each hub having a plurality of blade sockets adapted to receive and adjustably support a propeller blade, power actuated means carried by each hub for adjusting the pitch of said blades, a regulator secured to and rotatable with each hub, means within each regulator energized by rotation of said hubs for developing power to effect operation of said power actuated means, control means in each regulator-hub combination including a follow-up connection with the propeller blades of that hub for controlling the application of said developed power to effect an adjustment in the pitch position of said blades, an actuator carried by and rotatable with the inboard regulator-hub combination, means within said inboard regulator for controlling the application of developed power in said inboard regulator to the actuator for effecting operation thereof, a member carried by said inboard regulator-hub combination and rotatable therewith, said member being supported for axial movement relative to said propeller hubs, means interconnecting said member and said actuator whereby operation of said actuator will effect axial movement of said member, and means interconnecting the control means of both regulator-hub combinations with said member for actuating and coordinating the actuation of the control means in both regulator-hub combinations upon operation of said actuator to thereby coordinate the pitch adjustment of the blades in both hubs.

26. In combination with a variable pitch propeller having fluid pressure operated means for controlling the pitch thereof, a governor comprising, a control valve having a plunger element responsive to speed and movable by the thrust of centrifugal force produced thereby, resilient means operatively engaging said plunger element and opposing movement thereof by centrifugal force, said valve including a spring-biased movable sleeve element having a plurality of spaced ports, said plunger element having a pair of spaced lands cooperative with said ports, a servo cylinder having disposed therein a reciprocable piston capable of fluid pressure actuation in either direction, means operatively connecting said piston and said sleeve element whereby movements of said plunger element are followed-up by said sleeve element, a pressure connection for said valve, a drain connection for said valve, one of said connections communicating with said plunger between said lands, the other of said connections communicating with opposite ends of said sleeve on the other sides of said lands, one of said ports being connected to said servo cylinder on one side of said piston, the other ports being connected to the pitch controlling means, and means connecting the servo cylinder on the other side of said piston with said pitch controlling means, the construction and arrangement being such that flow from the governor to the pitch controlling means is proportional to the amount of speed error and the rate of change of speed error.

27. The combination set forth in claim 26 wherein the piston of said servo cylinder is of unequal area and divides said servo cylinder into a rod end chamber and a head end chamber, the head end chamber being connected to said one port of the control valve, and the rod end chamber being connected with said pitch controlling means.

28. In combination with a variable pitch propeller having fluid pressure operated means for controlling the pitch position thereof, a governor comprising, a control valve having a centrifugally actuated, speed responsive plunger element, resilient means operatively engaging said plunger element and opposing movement thereof by centrifugal force, said valve including a spring-biased sleeve element having a plurality of spaced ports, said plunger and sleeve being relatively movable, said plunger having a pair of spaced lands cooperative with said ports, a servo cylinder having disposed therein a reciprocable piston capable of fluid pressure actuation in either direction, means operatively connecting the piston and said sleeve element whereby movements of said plunger element are followed-up by said sleeve element, a pressure connection communicating with said plunger between said lands, a drain connection communicating with opposite ends of said sleeve on the other sides of said lands, means connecting one of said ports with one end of said servo cylinder, the other of said ports being connected to said pitch controlling means, and means connecting the other side of said servo cylinder with said pitch controlling means, the construction and arrangement being such that flow from the control valve is proportional to the amount of speed error and flow from the servo cylinder is proportional to the rate of change of speed error.

(References on following page)

References Cited in the file of this patent

UNITED STATES PATENTS

| | | |
|---|---|---|
| 2,154,359 | Sarazin | Apr. 11, 1939 |
| 2,261,444 | Neubert | Nov. 4, 1941 |
| 2,421,514 | Martin et al. | June 3, 1947 |
| 2,498,810 | Huber | Feb. 28, 1950 |
| 2,514,248 | Lonbard | July 4, 1950 |
| 2,533,346 | Brady et al. | Dec. 12, 1950 |
| 2,576,619 | Martin | Nov. 27, 1951 |
| 2,619,182 | Martin | Nov. 25, 1952 |